US012219283B2

(12) United States Patent
Matsumoto

(10) Patent No.: US 12,219,283 B2
(45) Date of Patent: Feb. 4, 2025

(54) IMAGING DEVICE

(71) Applicant: SONY SEMICONDUCTOR SOLUTIONS CORPORATION, Kanagawa (JP)

(72) Inventor: Isao Matsumoto, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 70 days.

(21) Appl. No.: 18/042,266

(22) PCT Filed: Aug. 11, 2021

(86) PCT No.: PCT/JP2021/029635
§ 371 (c)(1),
(2) Date: Feb. 20, 2023

(87) PCT Pub. No.: WO2022/044808
PCT Pub. Date: Mar. 3, 2022

(65) Prior Publication Data
US 2023/0300496 A1 Sep. 21, 2023

(30) Foreign Application Priority Data
Aug. 26, 2020 (JP) ................. 2020-143006

(51) Int. Cl.
H04N 25/76 (2023.01)
H04N 25/772 (2023.01)
(52) U.S. Cl.
CPC ....... H04N 25/7795 (2023.01); H04N 25/772 (2023.01)
(58) Field of Classification Search
None
See application file for complete search history.

(56) References Cited

U.S. PATENT DOCUMENTS

2010/0079611 A1* 4/2010 Suzuki ................... H04N 25/70
348/E5.022
2016/0316160 A1* 10/2016 Kurokawa ........... H04N 25/745

FOREIGN PATENT DOCUMENTS

JP 2011-160318 A 8/2011
JP 2018-074209 A 5/2018
WO 2016/136448 A1 9/2016

OTHER PUBLICATIONS

International Search Report and Written Opinion of PCT Application No. PCT/JP2021/029635, issued on Nov. 16, 2021, 08 pages of ISRWO.

* cited by examiner

Primary Examiner — Quan Pham
(74) Attorney, Agent, or Firm — CHIP LAW GROUP

(57) ABSTRACT

An imaging device according to the present disclosure includes: a clock signal generator; a plurality of light-receiving pixels; a plurality of gate circuits; and a plurality of counters. The clock signal generator supplies a first clock signal to a clock signal path. The plurality of light-receiving pixels is provided side by side in the first direction and grouped into a plurality of pixel groups in the first direction. The plurality of light-receiving pixels each includes a light-receiving circuit, a comparison circuit, and a latch circuit. The comparison circuit performs a comparison operation on the basis of a pixel signal and a reference signal having a ramp waveform. The latch circuit latches a time code on the basis of a result of comparison. The plurality of gate circuits is each configured to output a signal in a clock signal path as a second clock signal. The plurality of gate circuits each controls, on the basis of a control signal, whether or not to output the second clock signal. The plurality of counters each generates the time code on the basis of the second clock signal supplied from the corresponding gate circuit and (Continued)

supplies the generated time code to two or more light-receiving pixels belonging to the corresponding pixel group.

12 Claims, 17 Drawing Sheets

[FIG. 1]
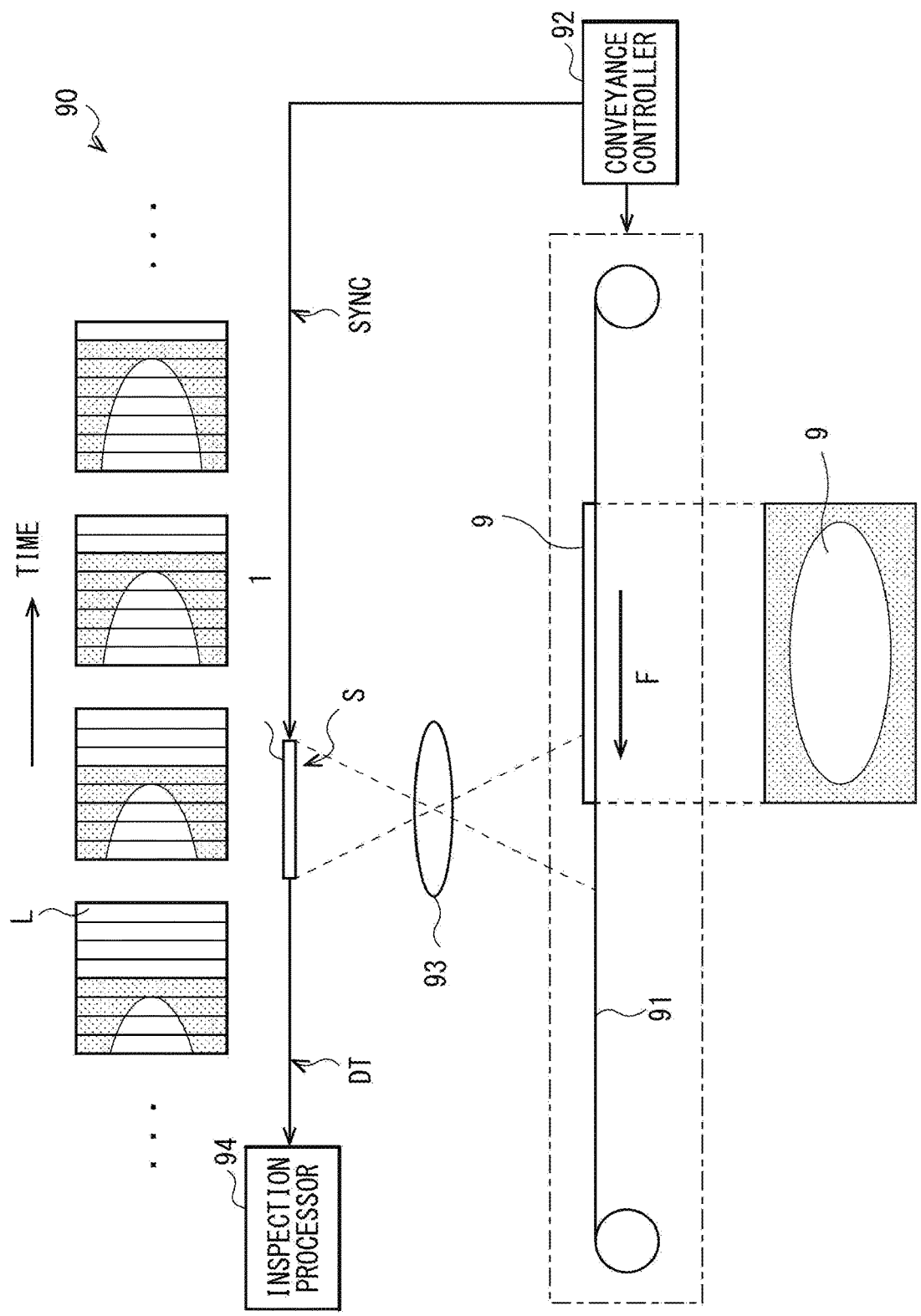

[FIG. 2]
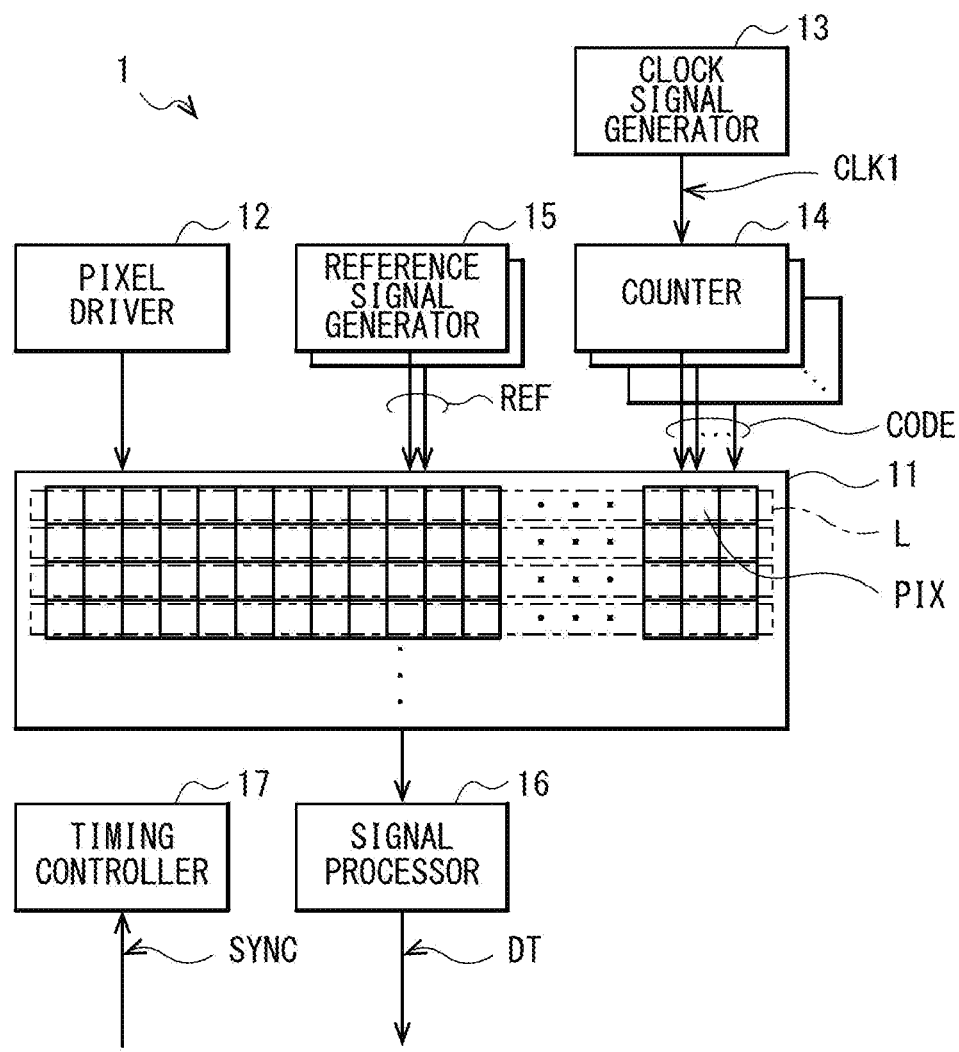

[FIG. 3]
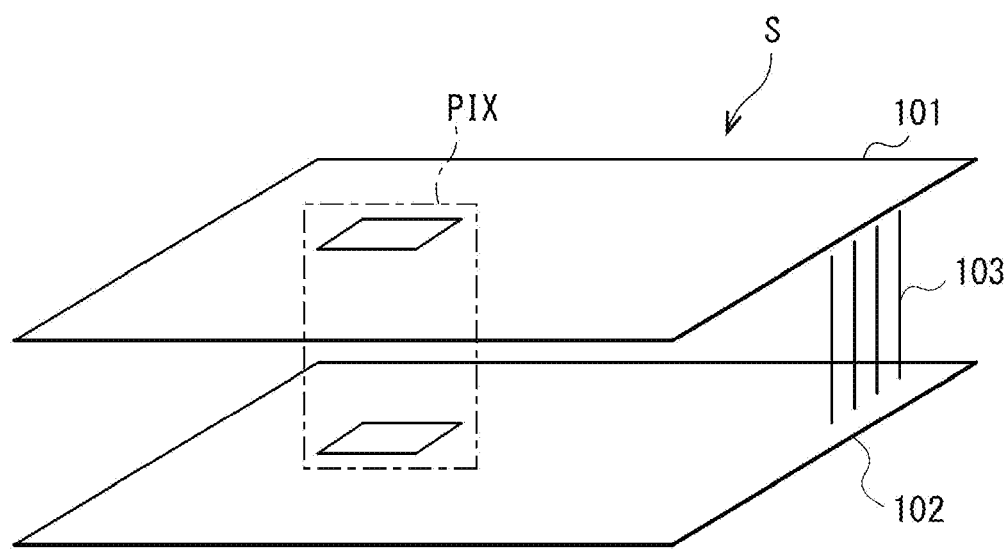

[FIG. 4]
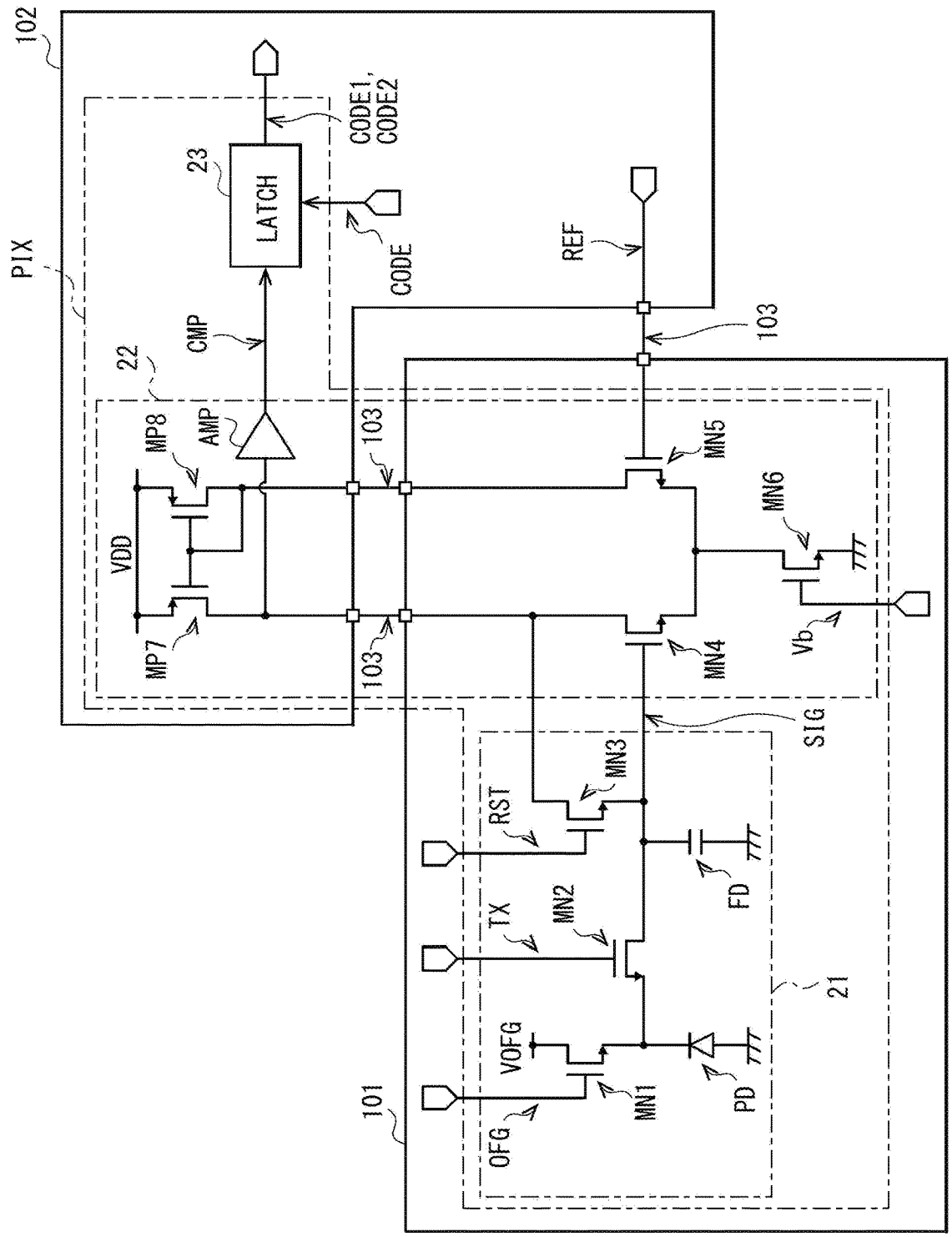

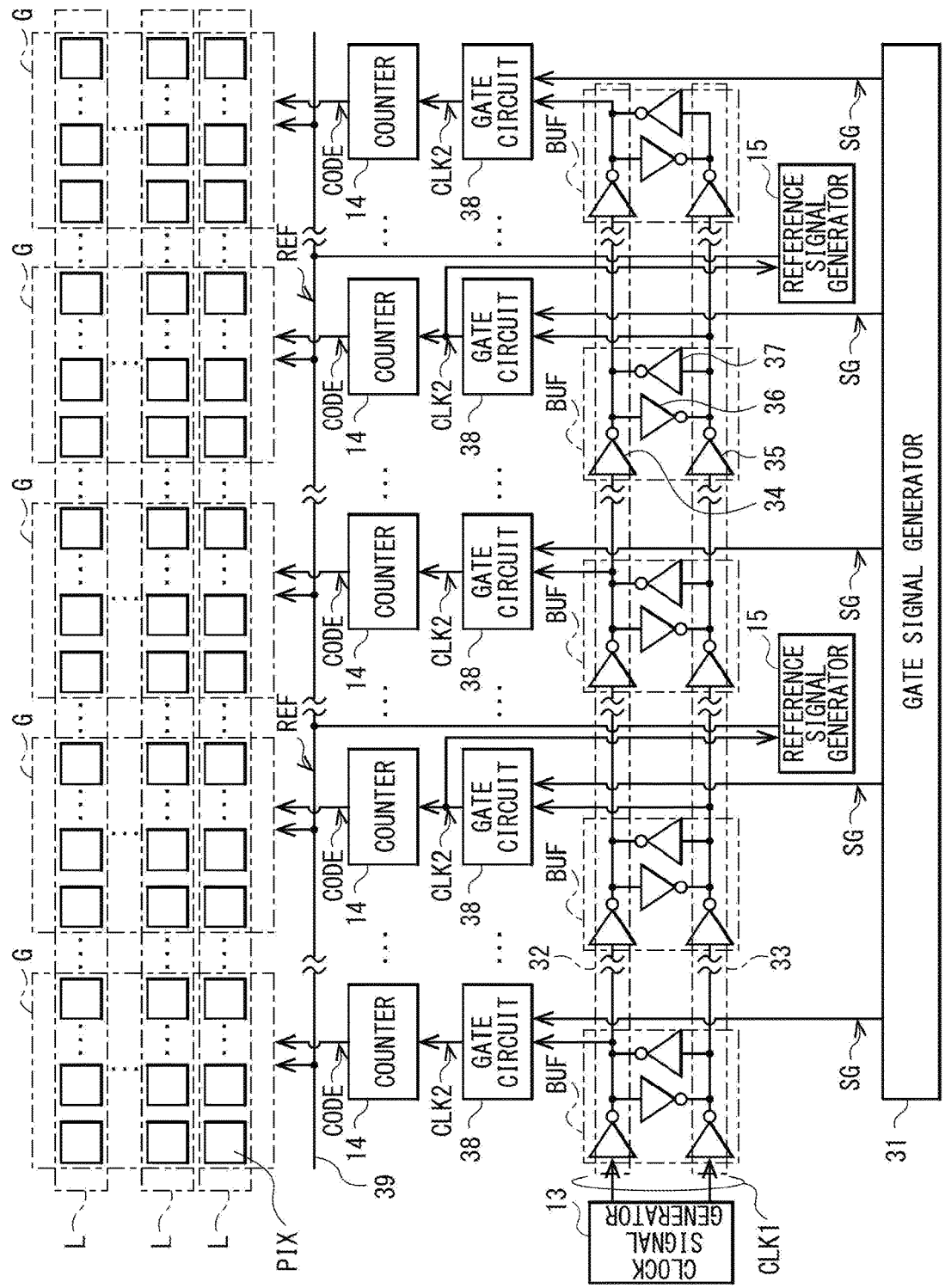
[FIG. 5]

[FIG. 6]
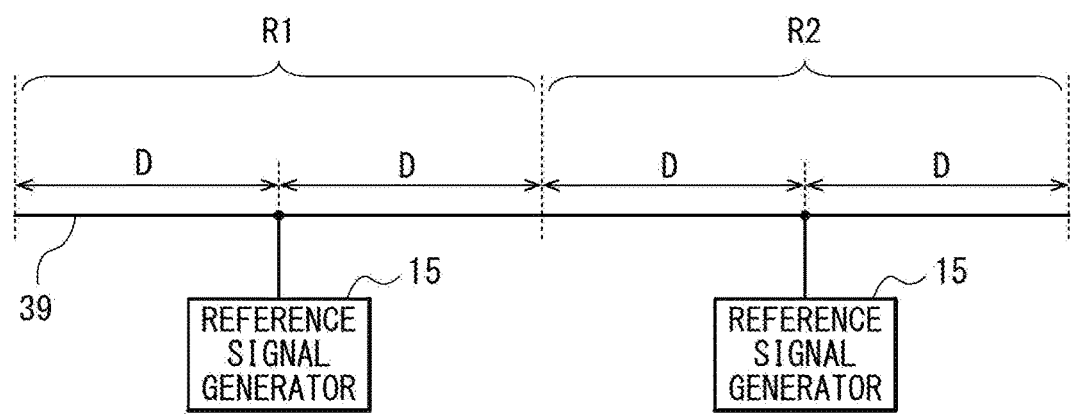

[FIG. 7]
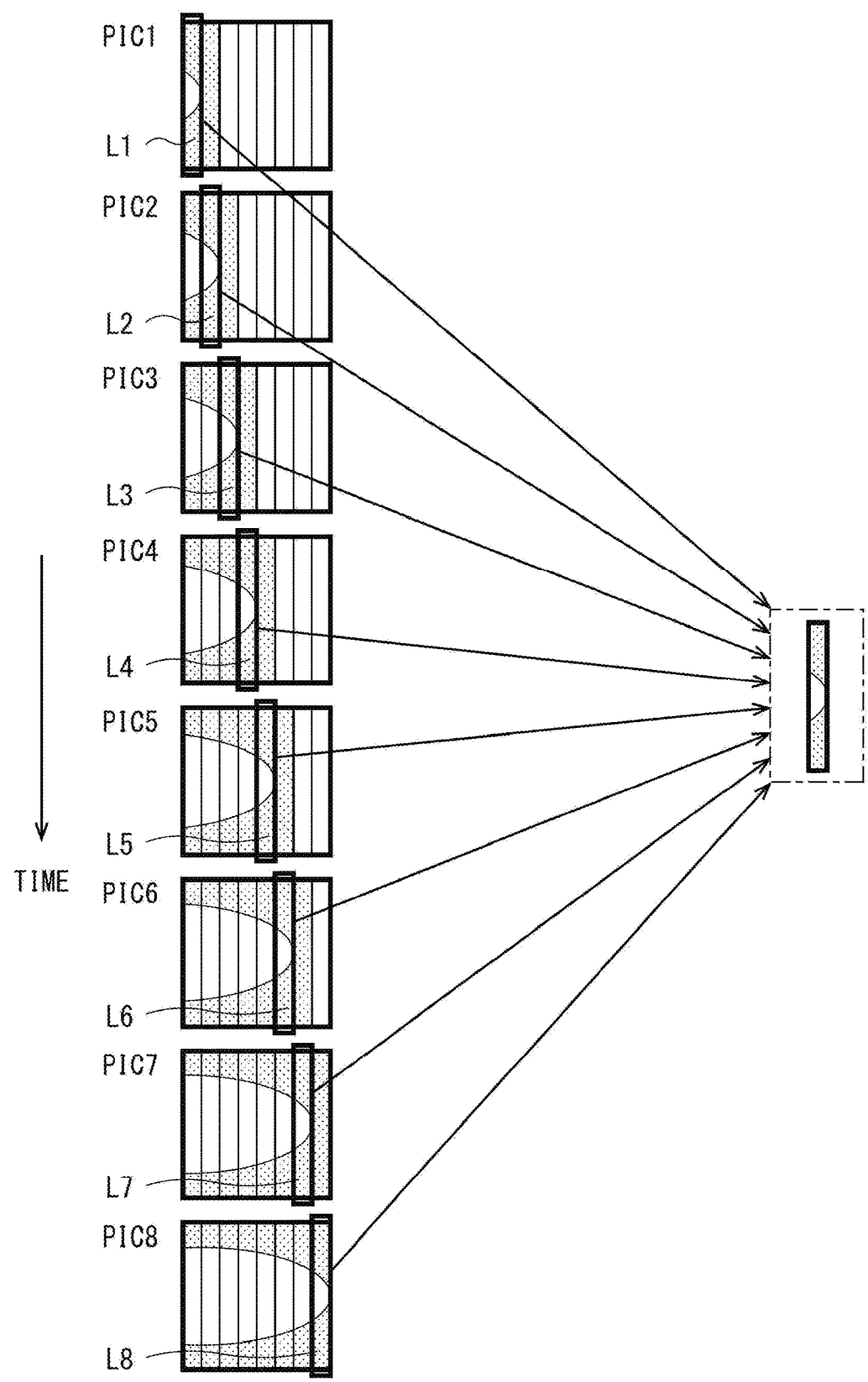

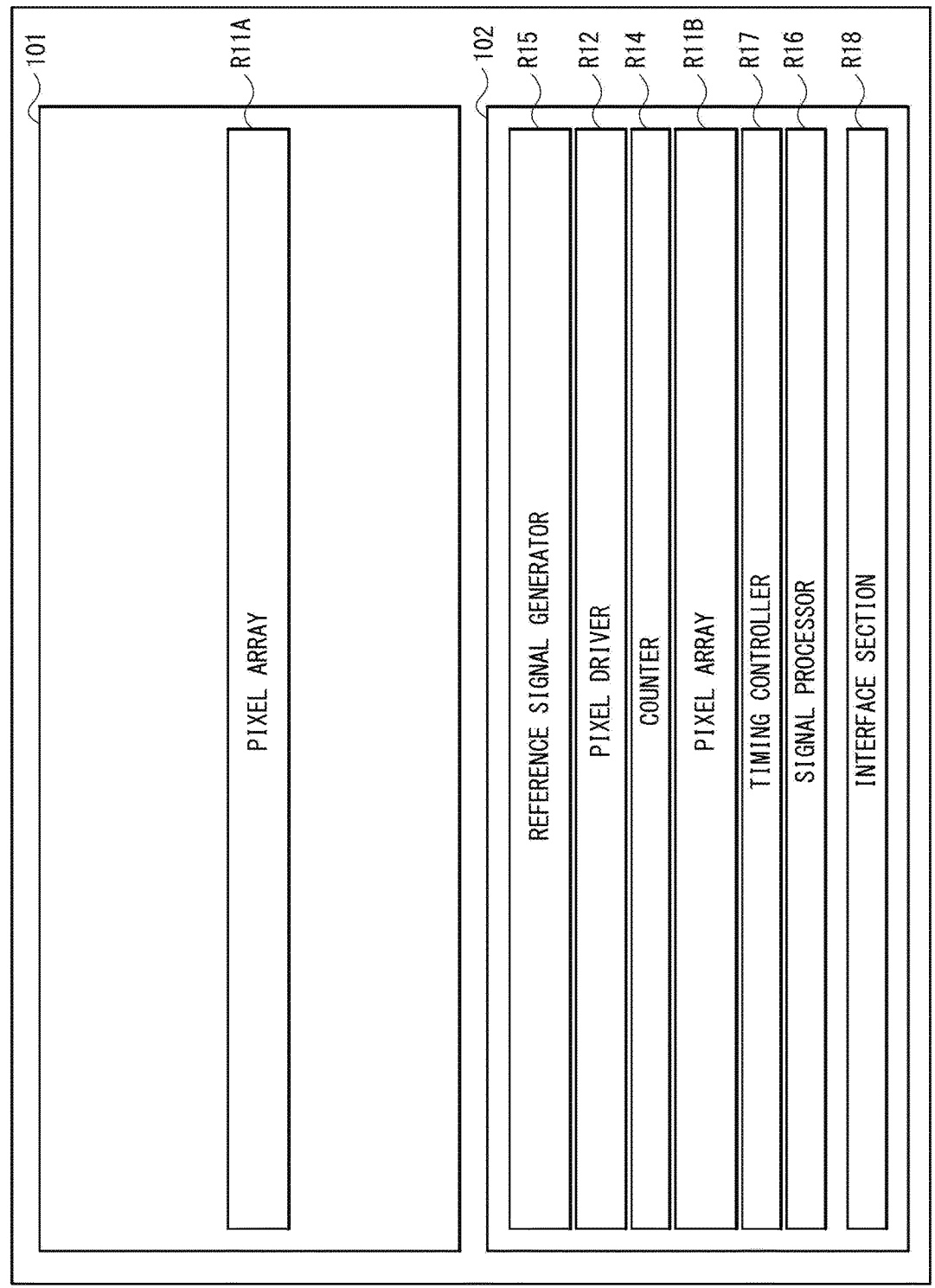

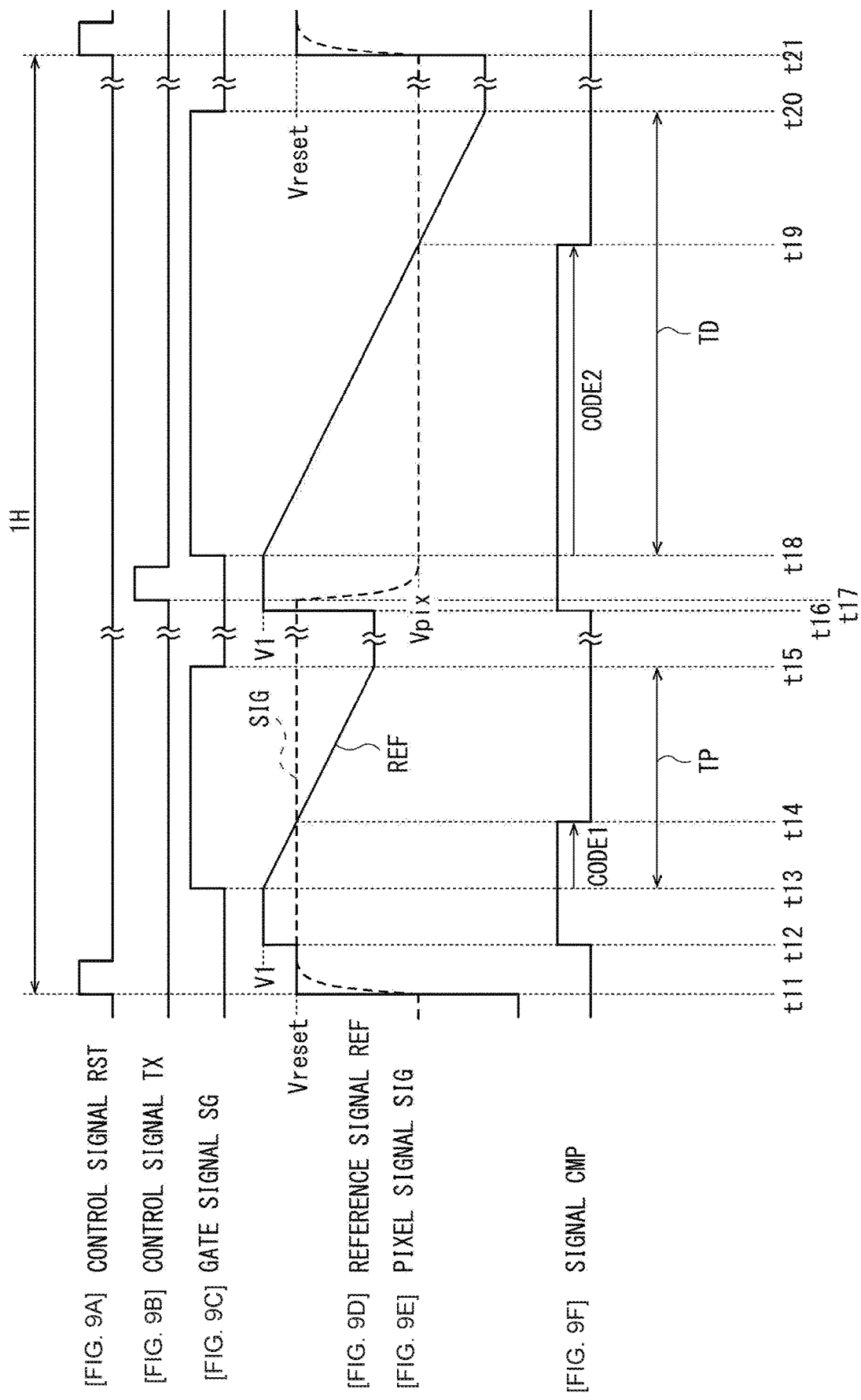

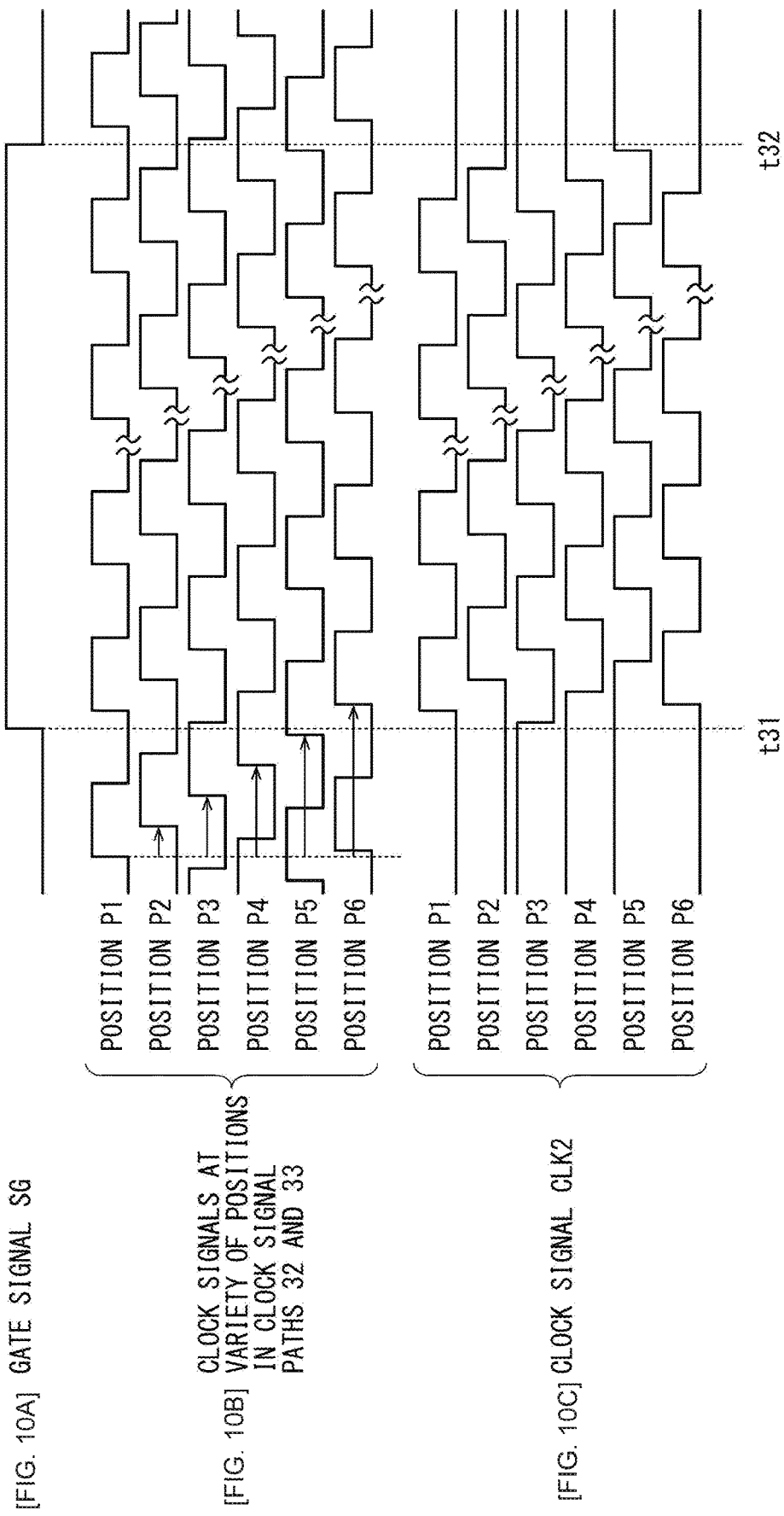

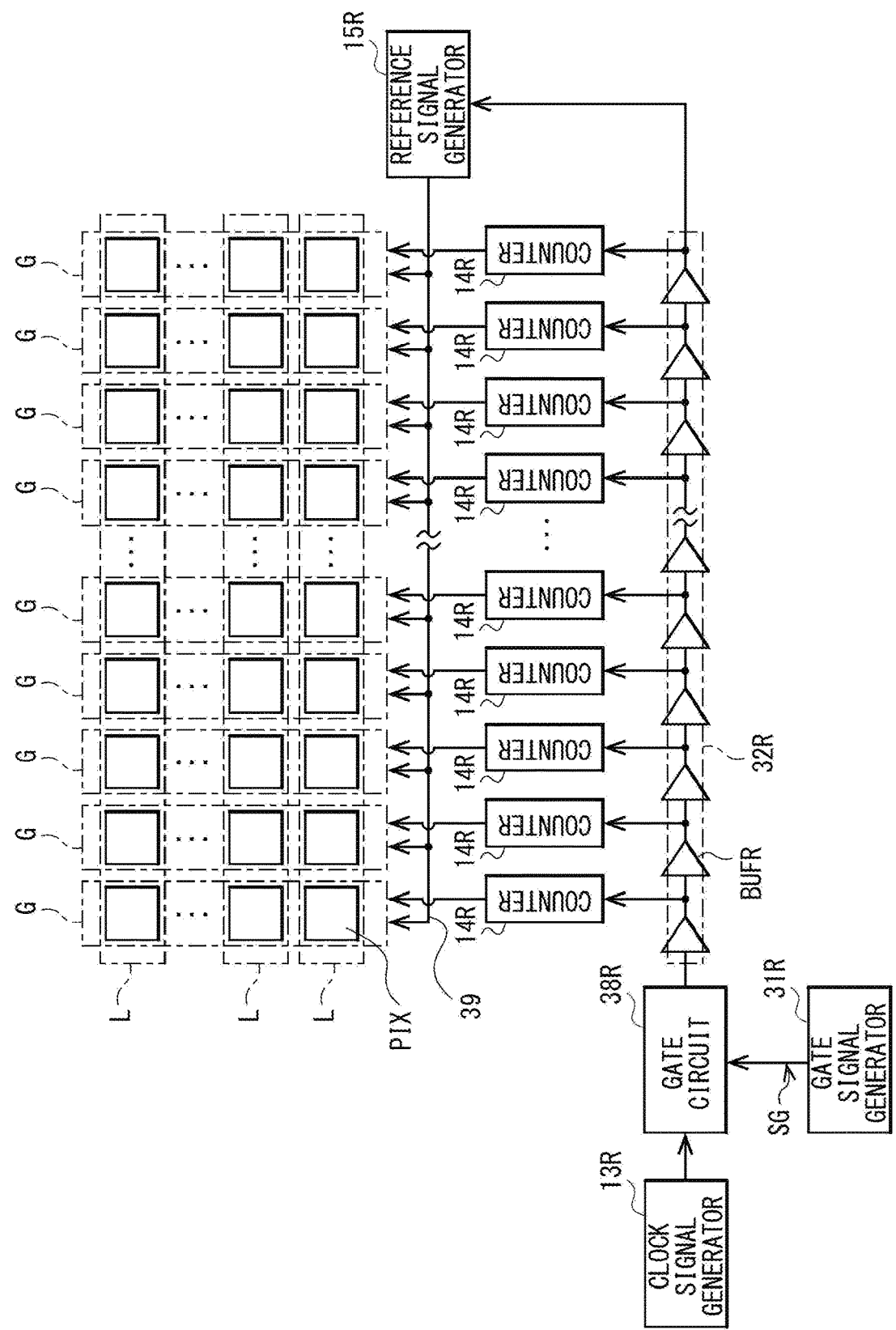
[FIG. 11]

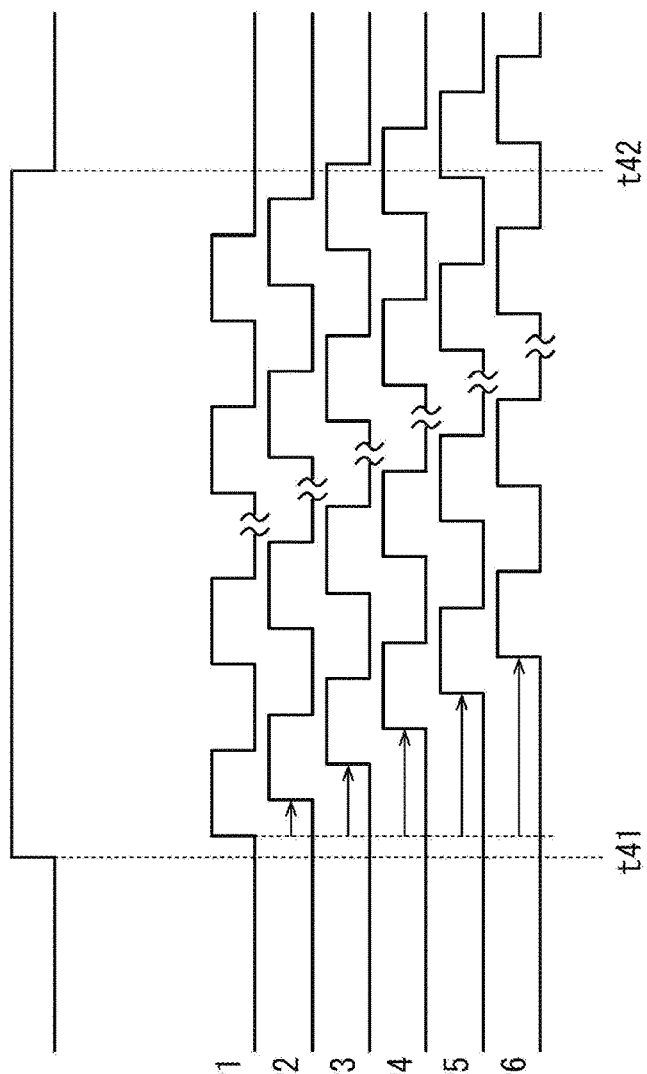

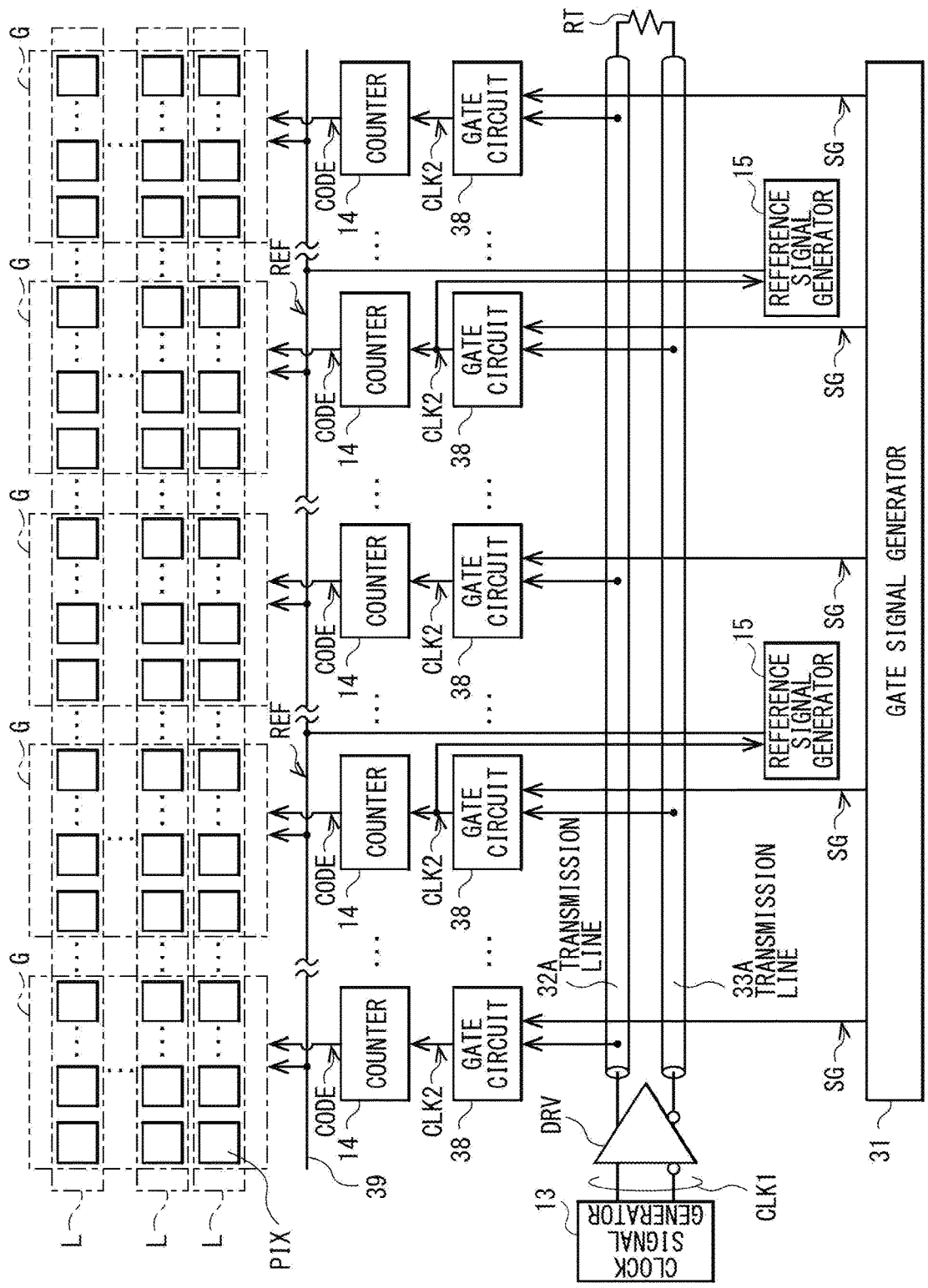
[FIG. 13]

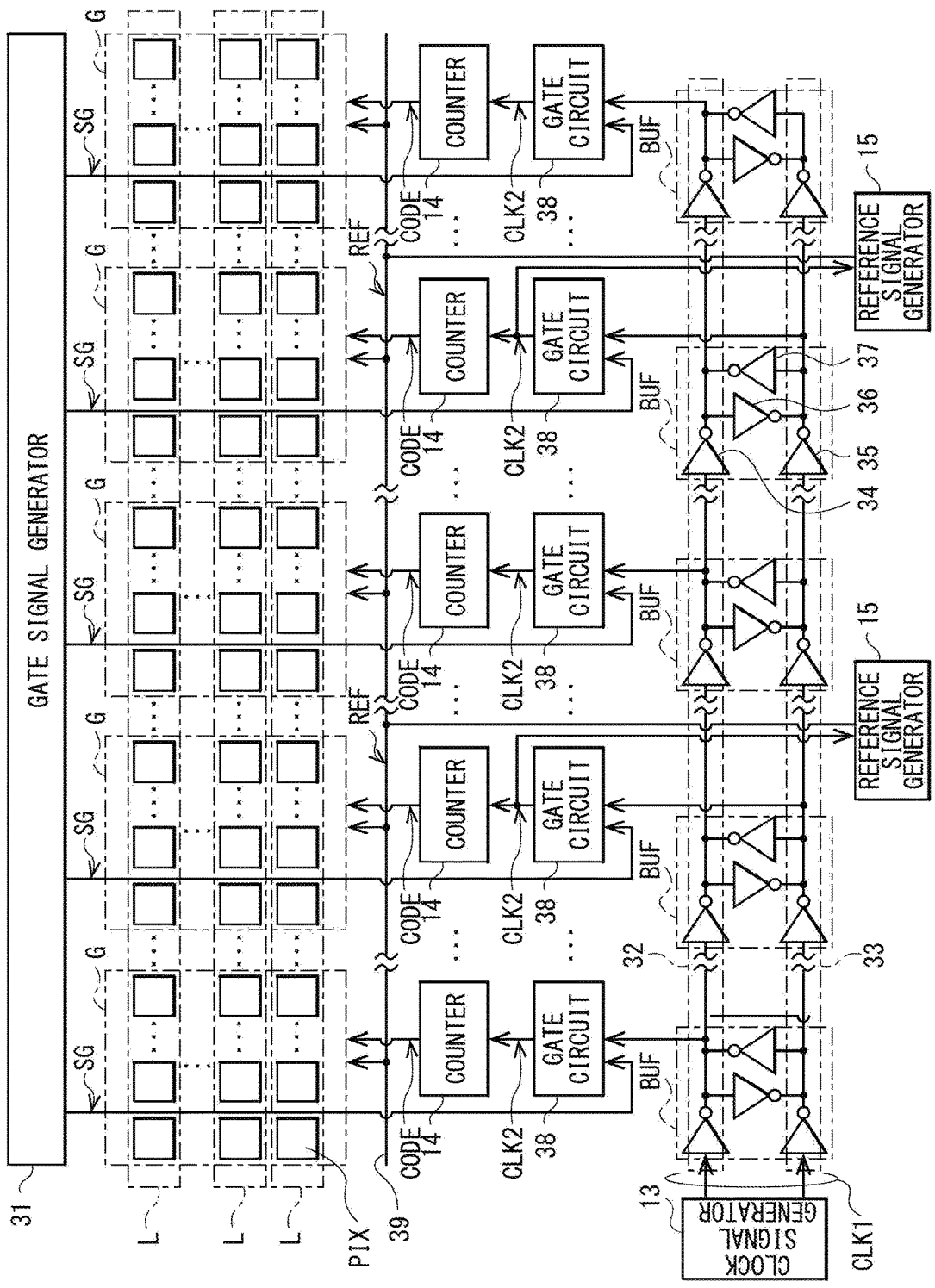
[FIG. 14]

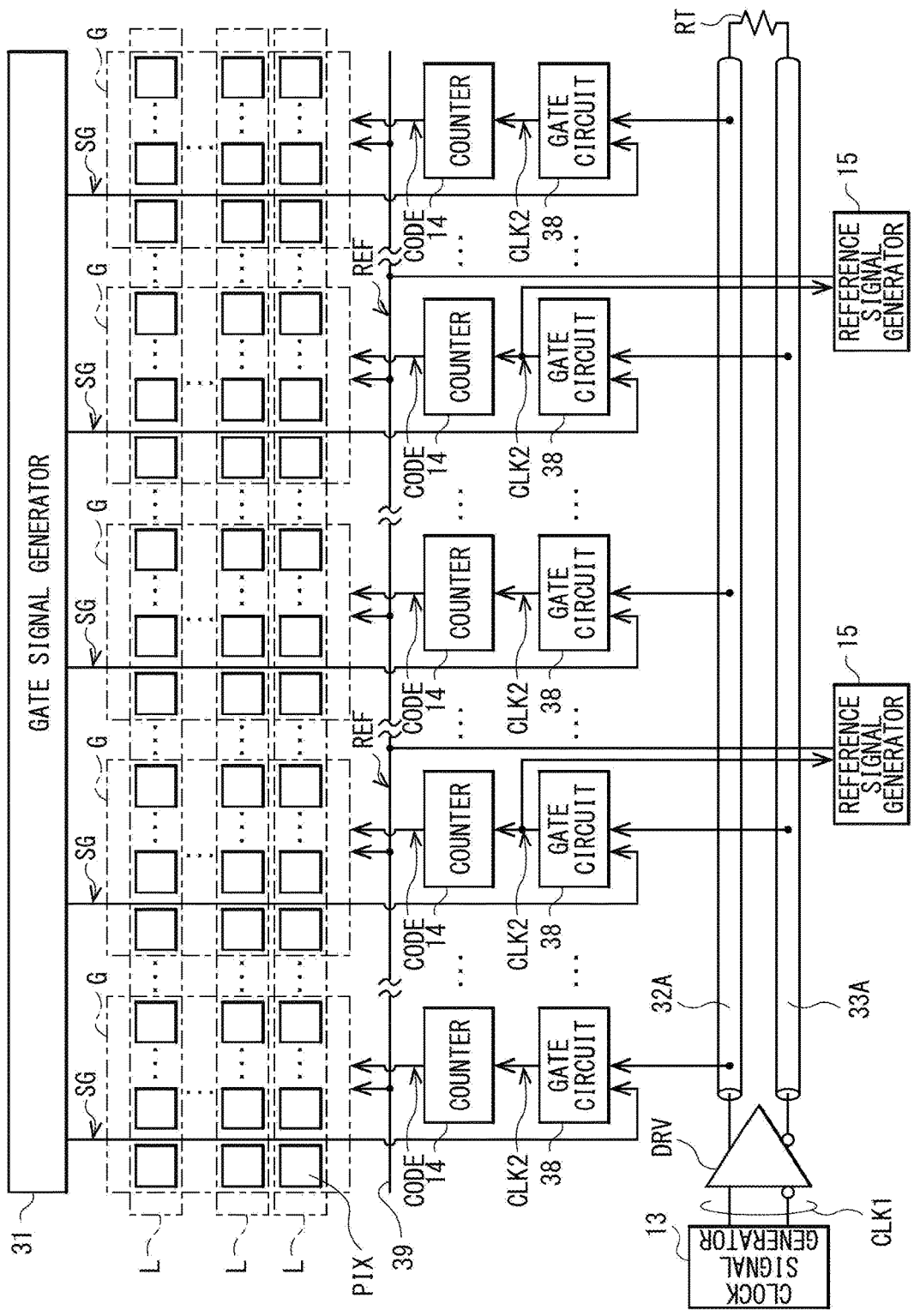
[FIG. 15]

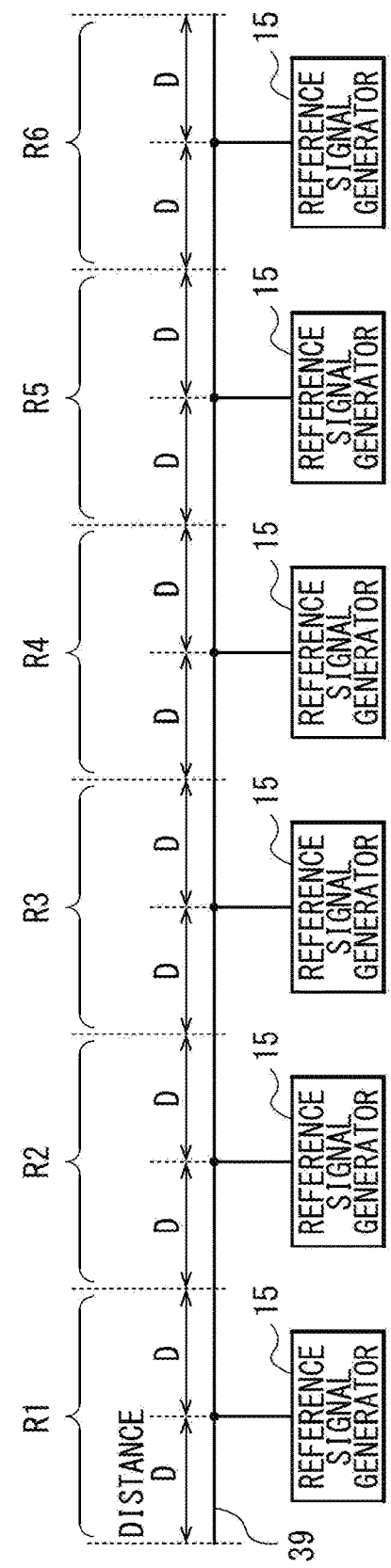
[FIG. 16]

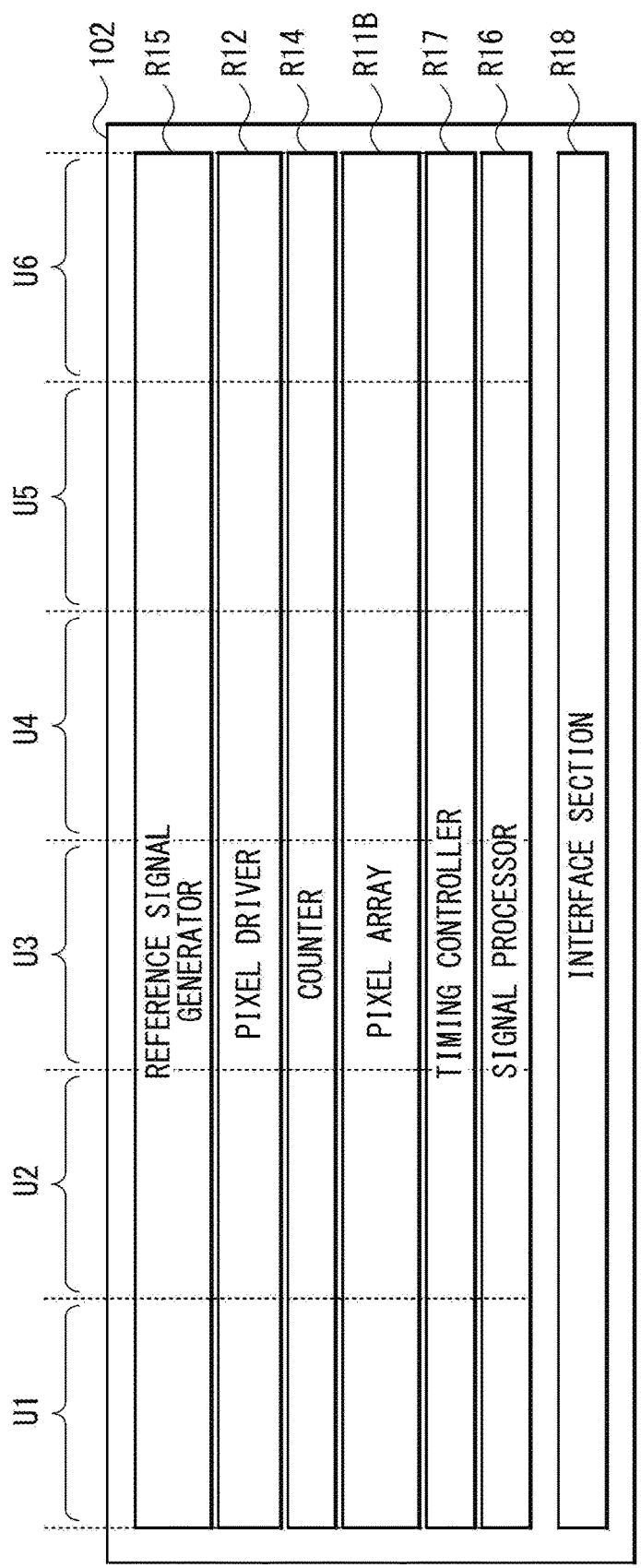
[FIG. 17]

IMAGING DEVICE

CROSS REFERENCE TO RELATED APPLICATIONS

This application is a U.S. National Phase of International Patent Application No. PCT/JP2021/029635 filed on Aug. 11, 2021, which claims priority benefit of Japanese Patent Application No. JP 2020-143006 filed in the Japan Patent Office on Aug. 26, 2020. Each of the above-referenced applications is hereby incorporated herein by reference in its entirety.

TECHNICAL FIELD

The present disclosure relates to an imaging device that images an object.

BACKGROUND ART

In an imaging device, frequently, a pixel generates a pixel signal corresponding to the amount of received light and an AD (Analog to Digital) conversion circuit converts the pixel signal into a digital code. For example, PTL 1 discloses an imaging device in which each of the pixels performs AD conversion.

CITATION LIST

Patent Literature

PTL 1: International Publication No. WO 2016/136448

SUMMARY OF THE INVENTION

Incidentally, an imaging device includes, for example, a line sensor including one or more pixel lines. The line sensor is sometimes requested to perform a high-speed operation.

It is desirable to provide an imaging device that is able to perform a high-speed operation.

An imaging device according to an embodiment of the present disclosure includes: a clock signal generator; a plurality of light-receiving pixels; a plurality of gate circuits; and a plurality of counters. The clock signal generator is configured to generate a first clock signal and supply the first clock signal to a clock signal path. The plurality of light-receiving pixels is provided side by side in a first direction and grouped into a plurality of pixel groups in the first direction. The plurality of light-receiving pixels each includes a light-receiving circuit, a comparison circuit, and a latch circuit. The light-receiving circuit is configured to generate a pixel signal corresponding to an amount of received light. The comparison circuit is configured to perform a comparison operation on the basis of a pixel signal and a reference signal having a ramp waveform. The latch circuit is configured to latch a time code on the basis of a result of comparison by the comparison circuit. The plurality of gate circuits is provided side by side in the first direction and provided in association with the plurality of respective pixel groups. The plurality of gate circuits is each configured to output a signal in the clock signal path as a second clock signal and control, on the basis of a control signal, whether or not to output the second clock signal. The plurality of counters is provided side by side in the first direction and provided in association with the plurality of respective gate circuits. The plurality of counters is each configured to generate the time code on the basis of the second clock signal supplied from the corresponding gate circuit among the plurality of gate circuits and supply the generated time code to two or more light-receiving pixels belonging to the corresponding pixel group among the plurality of pixel groups.

In the imaging device according to the embodiment of the present disclosure, the first clock signal is supplied to the clock signal path. The plurality of gate circuits each outputs this signal in the clock signal path as the second clock signal. The gate circuits each control, on the basis of the control signal, whether or not to output the second clock signal. The plurality of counters each generates the time code on the basis of the second clock signal supplied from the corresponding gate circuit. The generated time code is then supplied to the two or more light-receiving pixels belonging to the corresponding pixel group. The light-receiving pixel generates the pixel signal corresponding to the amount of received light, performs a comparison operation on the basis of the pixel signal and the reference signal, and latches the time code on the basis of a result of the comparison.

BRIEF DESCRIPTION OF DRAWING

FIG. 1 is an explanatory diagram illustrating a configuration example of an inspection system including an imaging device according to an embodiment of the present disclosure.

FIG. 2 is a block diagram illustrating a configuration example of the imaging device illustrated in FIG. 1.

FIG. 3 is an explanatory diagram illustrating an implementation example of the imaging device illustrated in FIG. 1.

FIG. 4 is a circuit diagram illustrating a configuration example of a light-receiving pixel illustrated in FIG. 2.

FIG. 5 is a block diagram illustrating a configuration example of a circuit portion for a time code and a reference signal in the imaging device illustrated in FIG. 1.

FIG. 6 is an explanatory diagram illustrating an example in which a reference signal generator and a signal wiring line illustrated in FIG. 5 are coupled.

FIG. 7 is an explanatory diagram illustrating an example of a TDI process by the imaging device illustrated in FIG. 2.

FIG. 8 is an explanatory diagram illustrating an example of a circuit layout in the imaging device illustrated in FIG. 2.

FIGS. 9A, 9B, 9C, 9D, 9E, and 9F are timing waveform chart illustrating an operation example of the imaging device illustrated in FIG. 2.

FIGS. 10A, 10B, and 10C are timing waveform chart illustrating an operation example of a gate circuit illustrated in FIG. 5.

FIG. 11 is a block diagram illustrating a configuration example of a circuit portion for a time code and a reference signal in an imaging device according to a comparative example.

FIGS. 12A and 12B are timing waveform chart illustrating an operation example of the imaging device illustrated in FIG. 11.

FIG. 13 is a block diagram illustrating a configuration example of a circuit portion for a time code and a reference signal in an imaging device according to a modification example.

FIG. 14 is a block diagram illustrating a configuration example of a circuit portion for a time code and a reference signal in an imaging device according to another modification example.

FIG. 15 is a block diagram illustrating a configuration example of a circuit portion for a time code and a reference signal in an imaging device according to another modification example.

FIG. 16 is an explanatory diagram illustrating an example in which a reference signal generator and a signal wiring line according to another modification example are coupled.

FIG. 17 is an explanatory diagram illustrating an example of a circuit layout in the imaging device according to another modification example.

MODES FOR CARRYING OUT THE INVENTION

The following describes an embodiment of the present disclosure in detail with reference to the drawings.

EMBODIMENT

Configuration Example

FIG. 1 illustrates a configuration example of an inspection system 90 in which an imaging device (imaging device 1) according to an embodiment is used. The inspection system 90 is configured to image an industrial product being conveyed, for example, by a belt conveyor and inspect the industrial product by using a resultant image. The inspection system 90 includes a belt conveyor 91, a conveyance controller 92, a lens system 93, the imaging device 1, and an inspection processor 94.

The belt conveyor 91 is configured to convey an industrial product to be inspected along a conveyance direction F. This industrial product is an object 9 that is imaged by the imaging device 1.

The conveyance controller 92 is configured to control a conveyance operation of this belt conveyor 91. In addition, the conveyance controller 92 generates a synchronization signal SYNC corresponding to the conveyance speed of the belt conveyor 91. This synchronization signal SYNC has a plurality of pulses disposed at the intervals corresponding to the conveyance speed. In this example, the pitch of these pulses is the same time as the time in which an image of the object 9 advances on an imaging surface S of the imaging device 1 by one pixel line L as described below. The conveyance controller 92 supplies the synchronization signal SYNC like this to the imaging device 1.

The lens system 93 is configured to guide the image of the object 9 to the imaging surface S of the imaging device 1. The lens system 93 is a Keplerian system in this example.

The imaging device 1 is a line sensor. The imaging device 1 is configured to image, through the lens system 93, the object 9 being conveyed by the belt conveyor 91. In this example, the lens system 93 is a Keplerian system. As illustrated in FIG. 1, the object 9 thus moves on the imaging surface S of the imaging device 1 in the direction opposite to the conveyance direction F. The imaging device 1 performs an imaging operation in response to each of the plurality of pulses included in the synchronization signal SYNC. The imaging device 1 includes the plurality of pixel lines L. In this example, the imaging device 1 performs an imaging operation on the basis of the synchronization signal SYNC whenever the image of the object 9 advances on the imaging surface S by the one pixel line L. The imaging device 1 then supplies image data DT indicating an imaging result to the inspection processor 94.

The inspection processor 94 is configured to inspect the industrial product (object 9) on the basis of the image data DT supplied from the imaging device 1.

FIG. 2 illustrates a configuration example of the imaging device 1. The imaging device 1 includes a pixel array 11, a pixel driver 12, a clock signal generator 13, a plurality of counters 14, two reference signal generators 15, a signal processor 16, and a timing controller 17.

The pixel array 11 includes a plurality of light-receiving pixels PIX disposed in a matrix. The plurality of light-receiving pixels PIX is divided into the plurality of pixel lines L. In FIG. 2, the pixel lines L extend in the horizontal direction and are provided side by side in the vertical direction. It is possible to cause each of the pixel lines L to have, for example, a length of several centimeters in the extending direction. The direction (vertical direction) in which the pixel lines L are provided side by side is a direction in which an image of the object 9 moves. Each of the plurality of pixel lines L includes a predetermined number of light-receiving pixels PIX. Each of the light-receiving pixels PIX is configured to perform an accumulation operation of accumulating electric charge corresponding to the amount of received light in an accumulation period and perform an AD (Analog to Digital) conversion operation of converting an analog signal corresponding to the electric charge accumulated in the accumulation period into a digital value. The light-receiving pixels PIX are disposed over two semiconductor substrates.

FIG. 3 illustrates an implementation example of the imaging device 1. In this example, the imaging device 1 is formed on two semiconductor substrates 101 and 102. The semiconductor substrate 101 is disposed on the imaging surface side of the imaging device 1 and the semiconductor substrate 102 is disposed on the opposite side to the imaging surface side of the imaging device 1. The semiconductor substrates 101 and 102 are superimposed. A wiring line of the semiconductor substrate 101 and a wiring line of the semiconductor substrate 102 are coupled by a wiring line 103. It is possible to use, for example, a metallic bond or the like such as Cu—Cu for the wiring line 103. The light-receiving pixels PIX are disposed over these two semiconductor substrates 101 and 102.

FIG. 4 illustrates a configuration example of the light-receiving pixel PIX. The light-receiving pixel PIX includes a light-receiving circuit 21, a comparison circuit 22, and a latch 23.

The light-receiving circuit 21 is configured to generate a pixel signal SIG including a pixel voltage Vpix corresponding to the amount of received light. The light-receiving circuit 21 is disposed on the semiconductor substrate 101. The light-receiving circuit 21 includes a photodiode PD, a discharge transistor MN1, a transfer transistor MN2, a floating diffusion FD, and a reset transistor MN3. The discharge transistor MN1, the transfer transistor MN2, and the reset transistor MN3 are N-type MOS (Metal Oxide Semiconductor) transistors.

The photodiode PD is a photoelectric conversion element that generates an amount of electric charge corresponding to the amount of received light and accumulates the electric charge therein. The anode of the photodiode PD is grounded and the cathode thereof is coupled to the source of the discharge transistor MN1 and the source of the transfer transistor MN2.

The gate of the discharge transistor MN1 is supplied with a control signal OFG supplied from the pixel driver 12 (FIG. 2), the drain thereof is supplied with a voltage VOFG, and the source thereof is coupled to the cathode of the photodiode PD and the source of the transfer transistor MN2.

The gate of the transfer transistor MN2 is supplied with a control signal TX supplied from the pixel driver 12 (FIG. 2), the source thereof is coupled to the cathode of the photodiode PD and the source of the discharge transistor MN1, and the drain thereof is coupled to the floating diffusion FD, the source of the reset transistor MN3, and the gate of a transistor MN4 (described below) in the comparison circuit 22.

The floating diffusion FD is configured to accumulate electric charge transferred from the photodiode PD. The floating diffusion FD includes, for example, a diffusion layer formed on a surface of the semiconductor substrate 101. FIG. 4 illustrates the floating diffusion FD by using the symbol of a capacitor.

The gate of the reset transistor MN3 is supplied with a control signal RST supplied from the pixel driver 12 (FIG. 2), the drain thereof is coupled to the drain of the transistor MN4 (described below) of the comparison circuit 22, and the source thereof is coupled to the floating diffusion FD, the drain of the transfer transistor MN2, and the gate of the transistor MN4 (described below) of the comparison circuit 22.

This configuration causes the light-receiving circuit 21 to discharge the electric charge accumulated in the photodiode PD by turning on the discharge transistor MN1 on the basis of the control signal OFG. The discharge transistor MN1 is then turned off to start the accumulation period and an amount of electric charge corresponding to the amount of received light is accumulated in the photodiode PD. Then, after the accumulation period ends, the light-receiving circuit 21 supplies a pixel signal SIG to the comparison circuit 22. The pixel signal SIG includes a reset voltage Vreset and the pixel voltage Vpix. Specifically, as described below, in a P-phase (Pre-charge phase) period TP after the voltage of the floating diffusion FD is reset, the light-receiving circuit 21 supplies the reset voltage of the floating diffusion FD at that time as the voltage Vreset to the comparison circuit 22. In addition, in a D-phase (Data phase) period TD after the electric charge is transferred from the photodiode PD to the floating diffusion FD, the light-receiving circuit 21 supplies the voltage of the floating diffusion FD at that time as the pixel voltage Vpix to the comparison circuit 22. In this way, the light-receiving circuit 21 supplies the pixel signal SIG including the reset voltage Vreset and the pixel voltage Vpix to the comparison circuit 22.

The comparison circuit 22 is configured to generate a signal CMP by comparing reference signals REF supplied from the two reference signal generators 15 (FIG. 2) and the pixel signal SIG supplied from the light-receiving circuit 21 (FIG. 2). The comparison circuit 22 sets the signal CMP at the high level in a case where the voltage of the reference signal REF is higher than the voltage of the pixel signal SIG. The comparison circuit 22 sets the signal CMP at the low level in a case where the voltage of the reference signal REF is lower than the voltage of the pixel signal SIG. As described below, the reference signal REF is a signal that has a so-called ramp waveform in which the voltage level gradually changes with the lapse of time in the P-phase period TP and the D-phase period TD. The comparison circuit 22 includes the transistors MN4 to MN6 and transistors MP7 and MP8. The transistors MN4 to MN6 are N-type MOS transistors and the transistors MP7 and MP8 are P-type MOS transistors. The comparison circuit 22 is disposed over the two semiconductor substrates 101 and 102. Specifically, the transistors MN4 to MN6 are disposed on the semiconductor substrate 101 and the transistors MP7 and MP8 and an amplifier AMP are disposed on the semiconductor substrate 102.

The gate of the transistor MN4 is supplied with the pixel signal SIG, the drain thereof is coupled to the drain of the reset transistor MN3 in the light-receiving circuit 21 and coupled to the drain of the transistor MP7 and the input terminal of the amplifier AMP through the wiring line 103 between the semiconductor substrates 101 and 102, and the source thereof is coupled to the source of the transistor MN5 and the drain of the transistor MN6. The gate of the transistor MN5 is supplied with the reference signal REF from the reference signal generator 15 through the wiring line 103 between the semiconductor substrates 101 and 102, the drain thereof is coupled to the drain of the transistor MP8 and the gates of the transistors MP7 and MP8 through the wiring line 103 between the semiconductor substrates 101 and 102, and the source thereof is coupled to the source of the transistor MN4 and the drain of the transistor MN6. The gate of the transistor MN6 is supplied with a bias voltage Vb, the drain thereof is coupled to the sources of the transistors MN4 and MN5, and the source thereof is grounded. The transistors MN4 and MN5 configure a differential pair and the transistor MN6 configures a constant current source.

The gate of the transistor MP7 is coupled to the gate and the drain of the transistor MP8 and coupled to the drain of the transistor MN5 through the wiring line 103 between the semiconductor substrates 101 and 102, the source thereof is supplied with a power supply voltage VDD, and the drain thereof is coupled to the input terminal of the amplifier AMP and coupled to the drain of the transistor MN4 and the drain of the reset transistor MN3 in the light-receiving circuit 21 through the wiring line 103 between the semiconductor substrates 101 and 102. The gate of the transistor MP8 is coupled to the gate of the transistor MP7 and the drain of the transistor MP8 and coupled to the drain of the transistor MN5 through the wiring line 103 between the semiconductor substrates 101 and 102, the source thereof is supplied with the power supply voltage VDD, and the drain thereof is coupled to the gates of the transistors MP7 and MP8 and coupled to the drain of the transistor MN5 through the wiring line 103 between the semiconductor substrates 101 and 102. The transistors MP7 and MP8 configure active loads of the transistors MN4 and MN5.

The input terminal of the amplifier AMP is coupled to the drain of the transistor MP7 and coupled to the drain of the reset transistor MN3 and the drain of the reset transistor MN3 in the light-receiving circuit 21 through the wiring line 103 between the semiconductor substrates 101 and 102 and the output terminal thereof is coupled to the latch 23. The comparison circuit 22 outputs the signal CMP from the output terminal of the amplifier AMP.

The latch 23 is configured to latch a time code CODE supplied from the counter 14 (FIG. 2) on the basis of the signal CMP supplied from the comparison circuit 22. The time code CODE changes with the lapse of time. As described below, the latch 23 latches the time code CODE at a transition timing of the signal CMP in the P-phase period TP to acquire the time (code value CODE1) from the start of the P-phase period TP to the transition of the signal CMP. In addition, the latch 23 latches the time code CODE at a transition timing of the signal CMP in the D-phase period TD to acquire the time (code value CODE2) from the start of the D-phase period TD to the transition of the signal CMP. The difference (CODE2−CODE1) between these two code values corresponds to the pixel value corresponding to the amount of received light. The latch 23 then supplies the two code values CODE1 and CODE2 to the signal processor 16. The latch 23 is disposed on the semiconductor substrate 102.

In this way, the light-receiving pixel PIX generates the pixel signal SIG including the pixel voltage Vpix corresponding to the amount of received light and performs AD conversion on the basis of this pixel signal SIG to generate the code values CODE1 and CODE2.

The pixel driver 12 (FIG. 2) is configured to control an operation of each of the plurality of light-receiving pixels PIX in the pixel array 11. Specifically, the pixel driver 12 generates the control signals OFG, TX and RST and supplies these control signals OFG, TX and RST to the light-receiving circuits 21 to control an operation of the light-receiving pixels PIX. The pixel driver 12 is disposed, for example, on the semiconductor substrate 102.

The clock signal generator 13 is configured to generate a clock signal CLK1 that is a differential signal. It is possible to cause the clock signal CLK1 to have, for example, a clock frequency of about several GHz. Each of the plurality of counters 14 is a Gray code counter in this example. Each of the plurality of counters 14 is configured to generate the time code CODE that changes with the lapse of time. Each of the two reference signal generators 15 is configured to generate the reference signal REF. The reference signal REF is a signal that has a so-called ramp waveform in which the voltage level gradually changes with the lapse of time in the P-phase period TP and the D-phase period TD. The clock signal generator 13, the plurality of counters 14, and the two reference signal generators 15 are disposed, for example, on the semiconductor substrate 102.

FIG. 5 illustrates an example of a more specific configuration of the circuit portion for the time code CODE and the reference signal REF in the imaging device 1. The imaging device 1 includes a plurality of cross-coupling buffers BUF, a gate circuit 38, a gate signal generator 31, and a signal wiring line 39. The plurality of cross-coupling buffers BUF, the gate circuit 38, the gate signal generator 31, and the signal wiring line 39 are disposed, for example, on the semiconductor substrate 102.

The plurality of light-receiving pixels PIX in the pixel array 11 is grouped into a plurality of pixel groups G along the extending direction of the pixel lines L. The plurality of counters 14 is provided in association with the plurality of these respective pixel groups G. The plurality of gate circuits 38 is provided in association with the plurality of respective counters 14.

The clock signal generator 13 supplies two clock signals to respective clock signal paths 32 and 33. The two clock signals are included in the clock signal CLK1 and are different from each other in polarity. The clock signal CLK1 is a differential signal.

The plurality of cross-coupling buffers BUF is provided in the clock signal paths 32 and 33. The cross-coupling buffers BUF includes inverters 34 to 37. The inverter 34 is provided in the clock signal path 32. The inverter 35 is provided in the clock signal path 33. The inverter 36 is provided downstream of the inverters 34 and 35. The input terminal of the inverter 36 is coupled to the clock signal path 32 and the output terminal thereof is coupled to the clock signal path 33. The inverter 37 is provided downstream of the inverters 34 and 35. The input terminal of the inverter 37 is coupled to the clock signal path 33 and the output terminal thereof is coupled to the clock signal path 32. This allows the imaging device 1 to transmit clock signals each having, for example, several GHz over a long distance along the clock signal paths 32 and 33 and keep the duty ratios of the clock signals in the clock signal paths 32 and 33.

The gate circuit 38 is configured to supply a clock signal in the clock signal path 32 or the clock signal path 33 to the corresponding counter 14 as a clock signal CLK2. For example, the adjacent gate circuits 38 among the plurality of gate circuits 38 are coupled to the respective clock signal paths 32 and 33. This makes it possible to prevent, for example, a load from concentrating on one of the clock signal path 32 or the clock signal path 33. It is to be noted that this is not limitative, but the gate circuit 38 may be coupled to any of the clock signal path 32 or the clock signal path 33. In addition, the gate circuit 38 controls, on the basis of a gate signal SG, whether or not to provide the clock signal CLK2 to the counter 14. Specifically, in the period in which the gate signal SG is active, the gate circuit 38 supplies the clock signal CLK2 to the counter 14. In the period in which the gate signal SG is inactive, the gate circuit 38 stops supplying the clock signal CLK2 to the counter 14.

The gate signal generator 31 is configured to generate the plurality of gate signals SG. The gate signal generator 31 makes the plurality of gate signals SG active together in the P-phase period TP and the D-phase period TD. The gate signal generator 31 makes the plurality of gate signals SG inactive together in the other periods. The plurality of gate signals SG has substantially the same transition timings. The gate signal generator 31 then supplies the plurality of generated gate signals SG to the plurality of respective gate circuits 38. In this example, the gate signal generator 31 and the gate circuits 38 are disposed on the same side as viewed from the pixel array 11.

In this configuration, the gate circuit 38 supplies the clock signals CLK2 to the counter 14 in the P-phase period TP and the D-phase period TD and the counter 14 generates the time codes CODE on the basis of the clock signals CLK2 and supplies the generated time codes CODE to the plurality of light-receiving pixels PIX belonging to the pixel group G corresponding to the counter 14 in these P-phase period TP and D-phase period TD.

The two reference signal generators 15 generate the reference signals REF on the basis of the clock signals CLK2 supplied from the two gate circuits 38 among the plurality of gate circuits 38 and supplies the generated reference signals REF to the one signal wiring line 39.

The signal wiring line 39 extends in the extending direction of the pixel lines L. The signal wiring line 39 is configured to transmit the reference signals REF generated by the two reference signal generators 15 to the plurality of light-receiving pixels PIX.

FIG. 6 illustrates an example in which the two reference signal generators 15 and the signal wiring line 39 are coupled. The signal wiring line 39 is divided into the same number of division regions (two division regions R1 and R2 in this example) as the number (two in this example) of reference signal generators 15. The two reference signal generators 15 are provided in association with these two division regions R1 and R2. The two reference signal generators 15 are each coupled to the signal wiring line 39 near the middle of the corresponding division region among the two division regions R1 and R2. Specifically, in FIG. 6, one of the two reference signal generators 15 is coupled to the signal wiring line 39 at the position corresponding to ¼ from the left in the extending direction of the signal wiring line 39 and the other is coupled to the signal wiring line 39 at the position corresponding to ¼ from the right. The two reference signal generators 15 then supply the generated reference signals REF to the one signal wiring line 39.

The signal processor 16 (FIG. 2) is configured to generate the image data DT by performing predetermined image processing on the basis of the code values CODE1 and CODE2 generated by the plurality of respective light-receiving pixels PIX. Examples of the predetermined image processing include a CDS process of generating pixel value VAL by using the principle of correlated double sampling (CDS; Correlated Double Sampling) on the basis of the two code values CODE1 and CODE2 generated by the light-receiving pixel PIX and a TDI (Time Delay Integration) process in which a process of adding the pixel values VAL is performed on the basis of a plurality of line images.

FIG. 7 illustrates an example of the TDI process on a line image for the one pixel line L. In this example, the pixel array 11 is provided with the eight pixel lines L. In FIG. 7, an image of the object 9 moves from left to right. The pixel line L disposed at the leftmost position is thus the most upstream pixel line L1.

The imaging device 1 sets an accumulation period on the basis of the synchronization signal SYNC whenever the image of the object 9 advances on the imaging surface S by the one pixel line L. This causes the pixel array 11 to generate a plurality of images (eight images PIC1 to PIC8 in this example) on the basis of respective accumulation results in the plurality of accumulation periods that has been sequentially set as illustrated in FIG. 7. In the images PIC1 to PIC8, an image of the object 9 advances in the right direction in FIG. 8 with the lapse of time by using the one pixel line L as a unit. For example, a line image for the pixel line L1 in the image PIC1, a line image for a pixel line L2 in the image PIC2, a line image for a pixel line L3 in the image PIC3, a line image for a pixel line L4 in the image PIC4, a line image for a pixel line L5 in the image PIC5, a line image for a pixel line L6 in the image PIC6, a line image for a pixel line L7 in the image PIC7, and a line image for a pixel line L8 in the image PIC8 are images illustrating the same portion of the object 9.

The signal processor 16 generates the image data DT on the basis of all the pixel lines L in the pixel array 11. In this example, the signal processor 16 performs a TDI process by performing a process of adding the pixel values VAL on the basis of a line image for the most upstream pixel line L1 in the image PIC1, a line image for the second pixel line L2 in the image PIC2, a line image for the pixel line L3 in the image PIC3, a line image for the pixel line L4 in the image PIC4, a line image for the pixel line L5 in the image PIC5, a line image for the pixel line L6 in the image PIC6, a line image for the pixel line L7 in the image PIC7, and a line image for the pixel line L8 in the image PIC8. The description above focuses on the one pixel line L in each of the images PIC1 to PIC8, but the same applies to the other pixel lines L. In this way, the signal processor 16 generates the image data DT.

In this way, the signal processor 16 generates the image data DT on the basis of the code values CODE1 and CODE2 generated by the plurality of respective light-receiving pixels PIX. The signal processor 16 is disposed, for example, on the semiconductor substrate 102.

The timing controller 17 is configured to control an operation timing of each of the blocks of the imaging device 1 on the basis of the synchronization signal SYNC supplied from the conveyance controller 92 (FIG. 1). The timing controller 17 is disposed, for example, on the semiconductor substrate 102.

FIG. 8 illustrates an example of a circuit layout in the imaging device 1. As illustrated in FIG. 3, the imaging device 1 includes the two semiconductor substrates 101 and 102 that are superimposed.

The semiconductor substrate 101 is provided with a region R11A. The light-receiving circuit 21 and the transistors MN4 to MN6 of the comparison circuit 22 in the pixel array 11 are disposed in this region R11A.

The semiconductor substrate 102 is provided with regions R15, R12, R14, R11B, R17, R16, and R18. The two reference signal generators 15 are disposed in the region R15. The pixel driver 12 is disposed in the region R12. The plurality of counters 14 is disposed in the region R14. The transistors MP7 and MP8 and the amplifier AMP of the comparison circuit 22 and the latch 23 in the pixel array 11 are disposed in the region R11B. The timing controller 17 is disposed in the region R17. The signal processor 16 is disposed in the region R16. An interface section is disposed in the region R18. The interface section exchanges signals between the imaging device 1 and the outside.

Here, the clock signal generator 13 corresponds to a specific example of a "clock signal generator" according to the present disclosure. The clock signal CLK1 corresponds to a specific example of a "first clock signal" according to the present disclosure. Each of the clock signal paths 32 and 33 corresponds to a specific example of a "clock signal path" according to the present disclosure. The inverter 34 corresponds to a specific example of a "first inverter" according to the present disclosure. The inverter 35 corresponds to a specific example of a "second inverter" according to the present disclosure. The inverter 36 corresponds to a specific example of a "third inverter" according to the present disclosure. The inverter 37 corresponds to a specific example of a "fourth inverter" according to the present disclosure. The light-receiving pixel PIX corresponds to a specific example of a "light-receiving pixel" according to the present disclosure. The pixel group G corresponds to a specific example of a "pixel group" according to the present disclosure. The light-receiving circuit 21 corresponds to a specific example of a "light-receiving circuit" according to the present disclosure. The pixel signal SIG corresponds to a specific example of a "pixel signal" according to the present disclosure. The reference signal REF corresponds to a specific example of a "reference signal" according to the present disclosure. The comparison circuit 22 corresponds to a specific example of a "comparison circuit" according to the present disclosure. The latch 23 corresponds to a specific example of a "latch circuit" according to the present disclosure. The gate circuit 38 corresponds to a specific example of a "gate circuit" according to the present disclosure. The counter 14 corresponds to a specific example of a "counter" according to the present disclosure. The reference signal generator 15 corresponds to a specific example of a "reference signal generator" according to the present disclosure. The signal wiring line 39 corresponds to a specific example of a "signal wiring line" according to the present disclosure. The gate signal generator 31 corresponds to a specific example of a "signal generator" according to the present disclosure. The semiconductor substrate 101 corresponds to a specific example of a "first semiconductor substrate" according to the present disclosure. The semiconductor substrate 102 corresponds to a specific example of a "second semiconductor substrate" according to the present disclosure.

[Operations and Workings]

Subsequently, the operations and workings of the imaging device 1 according to the present embodiment are described.

(Overview of Overall Operation)

First, an overview of an overall operation of the imaging device 1 is described with reference to FIGS. 1 and 2. The timing controller 17 controls an operation timing of each of the blocks of the imaging device 1 on the basis of the synchronization signal SYNC supplied from the conveyance controller 92 (FIG. 1). The pixel driver 12 controls an operation of each of the plurality of light-receiving pixels PIX. The clock signal generator 13 generates the clock signal CLK1 that is a differential signal. Each of the plurality of counters 14 generates the time code CODE. Each of the two reference signal generators 15 generates the reference signal REF. The plurality of light-receiving pixels PIX each generates the pixel signal SIG including the pixel voltage Vpix corresponding to the amount of received light and generates the code values CODE1 and CODE2 by performing AD conversion with the reference signal REF and the time code CODE on the basis of this pixel signal SIG. The signal processor 16 generates the image data DT by performing predetermined image processing on the basis of the code values CODE1 and CODE2 generated by the plurality of respective pixel circuits 20.

(Detailed Operation)

Each of the plurality of light-receiving pixels PIX (FIG. 4) in the pixel array 11 discharges the electric charge accumulated in the photodiode PD by turning on the discharge transistor MN1 on the basis of the control signal OFG. The discharge transistor MN1 is then turned off to start the accumulation period and an amount of electric charge corresponding to the amount of received light is accumulated in the photodiode PD. Then, after the accumulation period ends, the light-receiving pixel PIX performs AD conversion on the basis of the pixel signal SIG including the reset voltage Vreset and the pixel voltage Vpix. The following describes this AD conversion in detail.

FIGS. 9A, 9B, 9O, 9D, 9E, and 9F illustrate an operation example of the certain light-receiving pixel PIX of interest for AD conversion. FIG. 9A illustrates the waveform of the control signal RST. FIG. 9B illustrates the waveform of the control signal TX. FIG. 9C illustrates the waveform of the gate signal SG. FIG. 9D illustrates the waveform of the reference signal REF. FIG. 9E illustrates the waveform of the pixel signal SIG. FIG. 9F illustrates the waveform of the signal CMP.

First, at a timing t11, the reference signal generator 15 changes the voltage of the reference signal REF to the reset voltage Vreset on the basis of an instruction from the timing controller 17 (FIG. 9D). In addition, at this timing t11, the pixel driver 12 changes the control signal RST from the low level to the high level on the basis of an instruction from the timing controller 17 (FIG. 9A). This turns on the reset transistor MN3, resets the floating diffusion FD, and changes the voltage of the pixel signal SIG to the reset voltage Vreset in the light-receiving pixel PIX (FIG. 9E). The pixel driver 12 then changes the control signal RST from the high level to the low level a predetermined time after the timing t11 on the basis of an instruction from the timing controller 17 (FIG. 9A). This turns off the reset transistor MN3.

Next, at a timing t12, the reference signal generator 15 changes the voltage of the reference signal REF from the reset voltage Vreset to a voltage V1 on the basis of an instruction from the timing controller 17 (FIG. 9D). This causes the voltage of the reference signal REF to be higher than the voltage of the pixel signal SIG. The comparison circuit 22 thus sets the signal CMP at the high level (FIG. 9F).

Next, in the period (P-phase period TP) from a timing t13 to a timing t15, the light-receiving pixel PIX performs AD conversion on the basis of the voltage (reset voltage Vreset) of this pixel signal SIG. Specifically, first, at the timing t13, the gate signal generator 31 changes the gate signal SG from the low level (inactive) to the high level (active) on the basis of an instruction from the timing controller 17 (FIG. 9C). The gate circuit 38 thus supplies the clock signal CLK2 to the counter 14. The counter 14 starts an increment operation for the time code CODE on the basis of this clock signal CLK2. In addition, the reference signal generator 15 starts to decrease the voltage of the reference signal REF from the voltage V1 at a predetermined change rate on the basis of this clock signal CLK2 (FIG. 9D).

At a timing t14, the voltage of the reference signal REF then falls below the voltage (reset voltage Vreset) of the pixel signal SIG (FIGS. 9D and 9E). Accordingly, the comparison circuit 22 changes the signal CMP from the high level to the low level (FIG. 9F). The latch 23 latches the time code CODE on the basis of this transition of the signal CMP. The code value of the time code CODE latched by the latch 23 at this timing t14 is CODE1. This code value CODE1 is a code value corresponding to the length of the time from the timing t13 to the timing t14 and a code value corresponding to the reset voltage Vreset.

The P-phase period TP ends at the timing t15 and the gate signal generator 31 then changes the gate signal SG from the high level (active) to the low level (inactive) on the basis of an instruction from the timing controller 17 (FIG. 9C). This causes the gate circuit 38 to stop supplying the clock signal CLK2 to the counter 14. The gate circuit 38 refrains from outputting the clock signal CLK2 and the counter 14 thus stops the increment operation for the time code CODE. The reference signal generator 15 stops decreasing the voltage of the reference signal REF (FIG. 9D). The counter 14 sets the time code CODE to an initial value in the subsequent period. In the period from the timing t15 to a timing t16, the light-receiving pixel PIX then supplies the code value CODE1 to the signal processor 16.

Next, at a timing t16, the reference signal generator 15 changes the voltage of the reference signal REF to the voltage V1 on the basis of an instruction from the timing controller 17 (FIG. 9D). This causes the voltage of the reference signal REF to be higher than the voltage of the pixel signal SIG. The comparison circuit 22 thus changes the signal CMP from the low level to the high level (FIG. 9E).

Next, at a timing t17, the pixel driver 12 changes the control signal TX from the low level to the high level (FIG. 9B). This turns on the transfer transistor MN2, transfers electric charge generated in the photodiode PD to the floating diffusion FD, and changes the voltage of the pixel signal SIG to the pixel voltage Vpix in the light-receiving pixel PIX (FIG. 9E). The pixel driver 12 then changes the control signal TX from the high level to the low level a predetermined time after the timing t17 (FIG. 9B). This turns off the transfer transistor MN2.

Next, in the period (D-phase period TD) from a timing t18 to a timing t20, the light-receiving pixel PIX performs AD conversion on the basis of the voltage (pixel voltage Vpix) of this pixel signal SIG. Specifically, first, at the timing t18, the gate signal generator 31 changes the gate signal SG from the low level (inactive) to the high level (active) on the basis of an instruction from the timing controller 17 (FIG. 9C). The gate circuit 38 thus supplies the clock signal CLK2 to the counter 14. The counter 14 starts an increment operation for the time code CODE on the basis of this clock signal CLK2. In addition, the reference signal generator 15 starts to decrease the voltage of the reference signal REF from the voltage V1 at a predetermined change rate on the basis of this clock signal CLK2 (FIG. 9D).

At a timing t19, the voltage of the reference signal REF then falls below the voltage (reset voltage Vreset) of the pixel signal SIG (FIGS. 9D and 9E). Accordingly, the comparison circuit 22 changes the signal CMP from the high level to the low level (FIG. 9F). The latch 23 latches the time code CODE on the basis of this transition of the signal CMP. The code value of the time code CODE latched by the latch 23 at this timing t19 is CODE2. This code value CODE2 is a code value corresponding to the length of the time from the timing t18 to the timing t19 and a code value corresponding to the pixel voltage Vpix.

The D-phase period TD ends at the timing t20 and the gate signal generator 31 then changes the gate signal SG from the high level (active) to the low level (inactive) on the basis of an instruction from the timing controller 17 (FIG. 9C). This causes the gate circuit 38 to stop supplying the clock signal CLK2 to the counter 14. The gate circuit 38 refrains from outputting the clock signal CLK2 and the counter 14 thus stops the increment operation for the time code CODE. The reference signal generator 15 stops decreasing the voltage of the reference signal REF (FIG. 9D). The counter 14 sets the time code CODE to an initial value in the subsequent period. In the period from the timing t20 to a timing t21, the light-receiving pixel PIX then supplies the code value CODE2 to the signal processor 16.

The signal processor 16 performs predetermined image processing on the basis of the code values CODE1 and CODE2 generated by each of the plurality of light-receiving pixels PIX. For example, the signal processor 16 generates the pixel value VAL by using the principle of correlated double sampling on the basis of the two code values CODE1 and CODE2. Specifically, the signal processor 16 generates the pixel value VAL by subtracting, for example, the code value CODE1 from the code value CODE2. In addition, the signal processor 16 performs a TDI process as illustrated in FIG. 7.

(Operation of Gate Circuit 38)

In the imaging device 1, the plurality of respective gate circuits 38 supplies the clock signals at a variety of positions in the clock signal paths 32 and 33 to the corresponding counters 14 as the clock signals CLK2. The gate circuit 38 controls, on the basis of a gate signal SG, whether or not to provide the clock signal CLK2 to the counter 14. The following describes this operation in detail.

FIGS. 10A, 10B, and 10C illustrate operation examples of the six gate circuits 38 coupled to positions P1 to P6 in each of the clock signal paths 32 and 33 among the plurality of gate circuits 38. FIG. 10A illustrates the waveform of each of the gate signals SG supplied to the six gate circuits 38. FIG. 10B illustrates the waveforms of the clock signals at the positions P1 to P6 in the clock signal path 32. FIG. 10C illustrates the waveforms of the clock signals CLK2 outputted from the six gate circuits 38 coupled to the positions P1 to P6. Among these six positions P1 to P6, the position P1 is the most upstream and the position P6 is the most downstream. The positions P1, P2, P3, P4, P5, and P6 are set at substantially equal intervals in this order from the upstream side to the downstream side in the clock signal path 32.

As illustrated in FIG. 10B, the clock signal at the position P2 in each of the clock signal paths 32 and 33 is delayed more than the clock signal at the position P1. The same applies to the clock signals at the position P3 to the position P6. As the clock signal generator 13 in the imaging device 1 generates the clock signals CLK1 each having a higher frequency, the clock signals have greater phase differences at the positions P1 to P6 in the clock signal paths 32 and 33. In addition, similarly, as each of the pixel lines L has a greater length, the clock signals have greater phase differences at the positions P1 to P6 in the clock signal paths 32 and 33.

In the period from a timing t31 to a timing t32, the gate signal generator 31 changes the gate signal SG to the high level (active) (FIG. 10A). The gate circuits 38 output the clock signals in the clock signal paths 32 and 33 as the clock signals CLK2 on the basis of these gate signals SG at the high level (FIGS. 10B and 10C). For example, as the clock signals CLK1 each have a higher frequency, the clock signals CLK2 outputted from the six gate circuits 38 coupled to the positions P1 to P6 have greater phase differences. As each of the pixel lines L has a greater length, the clock signals CLK2 have greater phase differences.

In this way, the clock signals CLK2 outputted from the plurality of gate circuits 38 have phases different from each other. The clock signals CLK2, however, have substantially the same number of edges in the period from the timing t31 to the timing t32 in which the gate signals SG are at the high level (active). Thus, for example, in a case where the plurality of light-receiving pixels PIX corresponding to the pixel lines L receives the same amount of light, it is possible to obtain substantially the same code values CODE1 and CODE2 in the imaging device 1 by performing AD conversion based on even the clock signals at any positions in the clock signal paths 32 and 33. Line images based on the plurality of light-receiving pixels PIX belonging to the pixel lines L thus have substantially the same pixel value VAL.

In this way, the imaging device 1 is provided with the plurality of gate circuits 38 coupled to the clock signal paths 32 and 33. For example, even in a case where the clock signals CLK1 each have a high frequency or in a case where the line sensor has a great length, it is thus possible to reduce the possibility that the image quality decreases as described below in comparison with a comparative example.

In addition, in the imaging device 1, the clock signal generator 13 generates the clock signals CLK1 that are differential signals and supplies the clock signals to the plurality of gate circuits 38 by using the plurality of cross-coupling buffers BUF. For example, even in a case where the clock signals CLK1 each have a high frequency or in a case where the line sensor has a great length, this makes it possible to reduce the possibility that the duty ratios of the clock signals is considerably deviated from 50%. This makes it possible to reduce the possibility that, for example, the counters 14 abnormally operate, making it possible to reduce the possibility that the image quality decreases.

Comparative Example

Next, an imaging device 1R according to the comparative example is described. In the present comparative example, the configuration in which the time code CODE and the reference signal REF are generated on the basis of a clock signal is different from that of the present embodiment.

FIG. 11 illustrates an example of a more specific configuration of the circuit portion for the time code CODE and the reference signal REF in the imaging device 1R. The imaging device 1R includes a clock signal generator 13R, a gate circuit 38R, a gate signal generator 31R, a plurality of buffers BUFR, a plurality of counters 14R, and a reference signal generator 15R. In this example, the pixel group G includes the plurality of light-receiving pixels PIX provided side by side in the vertical direction in FIG. 11.

The clock signal generator 13R is configured to generate a clock signal that is a single-phase signal. The gate circuit 38R is configured to supply the clock signal generated by the clock signal generator 13R to a clock signal path 32R. In addition, the gate circuit 38R controls, on the basis of the gate signal SG, whether or not to supply the clock signal to the clock signal path 32R. The gate signal generator 31R is configured to generate the gate signal SG that is active in the P-phase period TP and the D-phase period TD and inactive in the other periods. The plurality of buffers BUFR is provided in the clock signal path 32R. The counters 14R are configured to generate the time codes CODE on the basis of clock signals in the clock signal path 32R and supply the generated time codes CODE to the light-receiving pixels PIX belonging to the corresponding pixel groups G. The reference signal generator 15R is coupled to the most downstream side of the clock signal path 32R. The reference signal generator 15R is configured to generate the reference signals REF on the basis of clock signals in the clock signal path 32R and supply the generated reference signals REF to the plurality of light-receiving pixels PIX through the signal wiring line 39.

FIGS. 12A and 12B illustrate examples of waveforms in the imaging device 1R. FIG. 12A illustrates the waveform of the gate signal SG. FIG. 12B illustrates the waveforms of clock signals inputted to the six counters 14R coupled to the positions P1 to P6 in the clock signal path 32R among the plurality of counters 14R.

As illustrated in FIG. 12B, the clock signal at the position P2 in the clock signal path 32R is delayed more than the clock signal at the position P1. The same applies to the clock signals at the position P3 to the position P6. In this way, the plurality of counters 14R generates the time codes CODE on the basis of the clock signals having shifted phases. This shifts the time codes CODE themselves in the light-receiving pixels PIX. Specifically, in FIG. 11, the time code CODE indicates advanced time in the light-receiving pixels PIX disposed on the left and the time code CODE indicates delayed time in the light-receiving pixels PIX disposed on the right.

In addition, the reference signal generator 15R generates the reference signal REF on the basis of the clock signal on the most downstream side of the clock signal path 32R. Thus, in the light-receiving pixels PIX, the timing at which the time code CODE starts to increment and the timing at which the reference signal REF starts to change are deviated. Specifically, in FIG. 11, the light-receiving pixels PIX disposed on the left have a longer time before the reference signal REF starts to change after the time code CODE starts to increment. The light-receiving pixels PIX disposed on the right have a shorter time before the reference signal REF starts to change before the time code CODE starts to increment.

As a result, for example, even in a case where the plurality of light-receiving pixels PIX belonging to the pixel lines L receives the same amount of light, the code values CODE1 and CODE2 change in the imaging device 1R in accordance with the position in the clock signal path 32R at which the signal on the basis of which AD conversion is performed is located. Line images based on the plurality of light-receiving pixels PIX belonging to the pixel lines L thus have so-called shading, decreasing the image quality.

In addition, in the imaging device 1R, the clock signal path 32R transmits clock signals that are single-phase signals. The duty ratios of the clock signals are thus deviated from 50%. In a case where the duty ratios of the clock signals are considerably deviated, the counters 14R supplied with such clock signals may fail to normally operate. In this case, the image quality decreases.

In contrast, the imaging device 1 according to the present embodiment is provided with the plurality of gate circuits 38 coupled to the clock signal paths 32 and 33. Each of the plurality of gate circuits 38 supplies the clock signal CLK2 to the counter 14 on the basis of the gate signal SG. The clock signals CLK2 thus have substantially the same number of edges in the period in which the gate signals SG are at the high level (active). This substantially prevents the time codes CODE from being deviated in the plurality of light-receiving pixels PIX. In addition, the reference signal generator 15 generates the reference signal REF on the basis of the clock signal CLK2 generated by the gate circuit 38. Thus, it is possible in the light-receiving pixels PIX to decrease the deviation between the timing at which the time code CODE starts to increment and the timing at which the reference signal REF starts to change. This makes it possible to reduce, for example, the possibility of shading in the imaging device 1. As a result, for example, even in a case where the clock signals CLK1 each have a high frequency or in a case where the line sensor has a great length, it is possible to reduce the possibility that the image quality decreases in the imaging device 1.

In addition, in the imaging device 1 according to the present embodiment, the clock signal paths 32 and 33 transmit clock signals that are differential signals and the clock signal paths 32 and 33 are provided with the plurality of cross-coupling buffers BUF. This makes it possible to reduce the possibility that the duty ratios of clock signals are considerably deviated from 50% in the imaging device 1, making it possible to reduce the possibility that the counters 14 abnormally operate. As a result, for example, even in a case where the clock signals CLK1 each have a high frequency or in a case where the line sensor has a great length, it is possible to reduce the possibility that the image quality decreases in the imaging device 1.

In this way, the imaging device 1 is provided with the plurality of gate circuits 38 corresponding to the plurality of respective pixel groups G. The plurality of these gate circuits 38 is able to output clock signals in the clock signal paths 32 and 33 as the clock signals CLK2 and controls, on the basis of the gate signals SG, whether or not to output the clock signals CLK2. In addition, the plurality of counters 14 is provided that corresponds to the plurality of respective gate circuits 38. The plurality of these counters 14 generates the time codes CODE on the basis of the clock signals CLK2 supplied from the corresponding gate circuits 38 and supplies the generated time codes CODE to the two or more light-receiving pixels PIX belonging to the corresponding pixel groups G. This makes it possible to reduce, for example, the possibility of shading in the imaging device 1, for example, even in a case where the clock signals CLK1 each have a high frequency or in a case where the line sensor has a great length as described above. It is thus possible to reduce the possibility that the image quality decreases. This allows the imaging device 1 to achieve a linear sensor that is able to perform, for example, a high-speed operation.

Effects

As described above, in the present embodiment, there is provided a plurality of gate circuits that corresponds to a plurality of respective pixel groups. The plurality of these gate circuits is able to output clock signals in the clock signal paths as the clock signals CLK2 and controls, on the basis of gate signals, whether or not to output the clock signals CLK2. In addition, there is provided a plurality of counters that corresponds to the plurality of respective gate circuits. The plurality of these counters generates time codes on the basis of the clock signals CLK2 supplied from the corresponding gate circuits and supplies the generated time codes to two or more light-receiving pixels belonging to the corresponding pixel groups. This makes it possible to perform, for example, a high-speed operation.

Modification Example 1

In the embodiment described above, the plurality of cross-coupling buffers BUF is provided, but this is not limitative. Instead of this, there may be provided transmission lines, for example, as with an imaging device 1A illustrated in FIG. 13. The imaging device 1A includes a driver DRV, transmission lines 32A and 33A, and a terminating resistor element RT. The driver DRV is configured to drive the transmission lines 32A and 33A on the basis of the clock signal CLK1 generated by the clock signal generator 13. The clock signal CLK1 is a differential signal. The transmission lines 32A and 33A are differential transmission lines each having a characteristic impedance of Zo. The terminating resistor element RT is configured to terminate the transmission lines 32A and 33A and set to have a resistance value of 2×Zo. The gate circuits 38 are able to supply clock signals in the transmission lines 32A and 33A to the corresponding counters 14 as the clock signals CLK2. Even in this case, it is possible to reduce the possibility that the duty ratios of clock signals in the transmission lines 32A and 33A are considerably deviated from 50%.

Modification Example 2

In the embodiment described above, as illustrated in FIG. 5, the gate signal generator 31 and the gate circuits 38 are disposed on the same side as viewed from the pixel array 11, but this is not limitative. Instead of this, the gate signal generator 31 and the gate circuits 38 may be disposed on the different sides as viewed from the pixel array 11, for example, as with an imaging device 1B illustrated in FIG. 14. In this example, the gate signal generator 31 supplies the gate signals SG to the gate circuits 38 through signal wiring lines that penetrate the pixel array 11.

Similarly, in the imaging device 1A according to the modification example 1, as illustrated in FIG. 13, the gate signal generator 31 and the gate circuits 38 are disposed on the same side as viewed from the pixel array 11, but this is not limitative. Instead of this, the gate signal generator 31 and the gate circuits 38 may be disposed on the different sides as viewed from the pixel array 11, for example, as with an imaging device 1C illustrated in FIG. 15.

Modification Example 3

In the embodiment described above, as illustrated in FIGS. 5 and 6, the two reference signal generators 15 are provided, but this is not limitative. It is possible to provide any number of reference signal generators 15. For example, in a case where the line sensor has a great length, it is possible to provide more reference signal generators 15 for the length. FIG. 16 illustrates an example in which the six reference signal generators 15 are provided. The signal wiring line 39 is divided into the six division regions R1 to R6. The six reference signal generators 15 are each coupled to the signal wiring line 39 near the middle of the corresponding division region among the six division regions R1 to R6.

In addition, not only the signal wiring line 39 is divided into six, but also the circuit layout of the imaging device may be divided into six. FIG. 17 illustrates an example of a circuit layout on the semiconductor substrate 102. As in the example of FIG. 8, the semiconductor substrate 102 is provided with the regions R15, R12, R14, R11B, R17, R16, and R18. The regions R15, R12, R14, R11B, R17, and R16 are divided into six units U (units U1 to U6). Each of the units U has the same layout pattern. This makes it possible to configure a long line sensor by disposing a large number of units U.

Although the present technology has been described above with reference to the embodiment and the modification examples, the present technology is not limited to this embodiment or the like. A variety of modifications are possible.

For example, in the embodiment or the like described above, the counter 14 includes a Gray code counter, but this is not limitative. Instead of this, the counter 14 may include, for example, a binary pattern generator.

For example, in the embodiment or the like described above, the clock signal generator 13 generates the clock signal CLK1 that is a differential signal, but this is not limitative. For example, in a case where the duty ratios of clock signals inputted to the plurality of gate circuits are not considerably deteriorated, clock signals that are single-phase signals may be generated.

For example, in the embodiment or the like described above, the imaging device 1 performs a TDI process, but this is not limitative. For example, the imaging device 1 may refrain from performing a TDI process. In this case, for example, the pixel array 11 may have the plurality of pixel lines L or the one pixel line L alone.

It is to be noted that the effects described in this specification are merely illustrative, but not limited. In addition, other effects may be included.

It is to be noted that the present technology may be configured as follows. According to the present technology having the following configurations, it is possible to achieve a high-speed operation.

(1)
An imaging device including:
  a clock signal generator that generates a first clock signal and supplies the first clock signal to a clock signal path;
  a plurality of light-receiving pixels that is provided side by side in a first direction and grouped into a plurality of pixel groups in the first direction, the plurality of light-receiving pixels each including a light-receiving circuit, a comparison circuit, and a latch circuit, the light-receiving circuit generating a pixel signal corresponding to an amount of received light, the comparison circuit performing a comparison operation on the basis of the pixel signal and a reference signal having a ramp waveform, the latch circuit latching a time code on the basis of a result of comparison by the comparison circuit;
  a plurality of gate circuits that is provided side by side in the first direction and provided in association with the plurality of respective pixel groups, the plurality of gate circuits being each configured to output a signal in the clock signal path as a second clock signal and controlling, on the basis of a control signal, whether or not to output the second clock signal; and a plurality of counters that is provided side by side in the first direction and provided in association with the plurality of respective gate circuits, the plurality of counters each generating the time code on the basis of the second clock signal supplied from the corresponding gate circuit among the plurality of gate circuits and supplying the generated time code to two or more light-receiving pixels belonging to the corresponding pixel group among the plurality of pixel groups.

(2)
The imaging device according to (1), in which
the clock signal path extends in the first direction, and
the plurality of gate circuits is coupled to the clock signal path at positions in the first direction at which the gate circuits are provided.

(3)
The imaging device according to (2), in which
the first clock signal includes a differential signal including two clock signals,
the clock signal path includes a first clock signal path and a second clock signal path, and
the clock signal generator supplies the two clock signals to the first clock signal path and the second clock signal path.

(4)
The imaging device according to (3), further including:
a first inverter that is provided in the first clock signal path;
a second inverter that is provided in the second clock signal path;
a third inverter that is provided downstream of the first inverter and the second inverter and includes an input terminal and an output terminal, the input terminal being coupled to the first clock signal path, the output terminal being coupled to the second clock signal path; and
a fourth inverter that is provided downstream of the first inverter and the second inverter and includes an input terminal and an output terminal, the input terminal being coupled to the second clock signal path, the output terminal being coupled to the first clock signal path.

(5)
The imaging device according to (3), in which the first clock signal path and the second clock signal path each include a transmission line.

(6)
The imaging device according to any of (1) to (5), further including a first reference signal generator that generates the reference signal on the basis of the second clock signal outputted from a first gate circuit among the plurality of gate circuits.

(7)
The imaging device according to (6), further including:
a second reference signal generator that generates the reference signal on the basis of the second clock signal outputted from a second gate circuit among the plurality of gate circuits; and
a signal wiring line that transmits the reference signals generated by the first reference signal generator and the second reference signal generator to the plurality of light-receiving pixels.

(8)
The imaging device according to any of (1) to (5), further including:
a predetermined number of reference signal generators, the predetermined number being larger than or equal to two, the predetermined number of respective reference signal generators generating the reference signals on the basis of the predetermined number of the second clock signals outputted from the predetermined number of gate circuits among the plurality of gate circuits; and
a signal wiring line that transmits the reference signals generated by the predetermined number of reference signal generators to the plurality of light-receiving pixels, in which
the signal wiring line is divided into the predetermined number of division regions in the first direction, and
the predetermined number of the respective reference signal generators are coupled to the signal wiring lines in the predetermined number of the division regions.

(9)
The imaging device according to any of (1) to (8), further including a signal generator that generates a plurality of the control signals, in which
the plurality of gate circuits and the signal generator are provided on a same side in a second direction as viewed from the plurality of light-receiving pixels, the second direction intersecting the first direction.

(10)
The imaging device according to any of (1) to (8), further including a signal generator that generates a plurality of the control signals, in which
the plurality of gate circuits and the signal generator are provided on different sides in a second direction as viewed from the plurality of light-receiving pixels, the second direction intersecting the first direction.

(11)
The imaging device according to any of (1) to (10), in which
the light-receiving circuit is provided on a first semiconductor substrate,
the latch circuit is provided on a second semiconductor substrate bonded to the first semiconductor substrate, and
the comparison circuit is provided over the first semiconductor substrate and the second semiconductor substrate.

(12)
The imaging device according to (11), in which the clock signal generator, the plurality of gate circuits, and the plurality of counters are provided on the second semiconductor substrate.

This application claims the priority on the basis of Japanese Patent Application No. 2020-143006 filed on Aug. 26, 2020 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. An imaging device, comprising:
a clock signal generator that generates a first clock signal and supplies the first clock signal to a clock signal path;
a plurality of light-receiving pixels that is provided side by side in a first direction and grouped into a plurality of pixel groups in the first direction, the plurality of light-receiving pixels each including a light-receiving circuit, a comparison circuit, and a latch circuit, the light-receiving circuit generating a pixel signal corresponding to an amount of received light, the comparison circuit performing a comparison operation on a basis of the pixel signal and a reference signal having a ramp waveform, the latch circuit latching a time code on a basis of a result of comparison by the comparison circuit;

a plurality of gate circuits that is provided side by side in the first direction and provided in association with the plurality of pixel groups respectively, the plurality of gate circuits being each configured to output a signal in the clock signal path as a second clock signal and controlling, on a basis of a control signal, whether or not to output the second clock signal; and a plurality of counters that is provided side by side in the first direction and provided in association with the plurality of gate circuits respectively, the plurality of counters each generating the time code on a basis of the second clock signal supplied from a corresponding gate circuit among the plurality of gate circuits and supplying the generated time code to two or more light-receiving pixels belonging to a corresponding pixel group among the plurality of pixel groups.

2. The imaging device according to claim 1, wherein the clock signal path extends in the first direction, and the plurality of gate circuits is coupled to the clock signal path at positions in the first direction at which the gate circuits are provided.

3. The imaging device according to claim 2, wherein the first clock signal includes a differential signal including two clock signals, the clock signal path includes a first clock signal path and a second clock signal path, and the clock signal generator supplies the two clock signals to the first clock signal path and the second clock signal path.

4. The imaging device according to claim 3, further comprising:

a first inverter that is provided in the first clock signal path;

a second inverter that is provided in the second clock signal path;

a third inverter that is provided downstream of the first inverter and the second inverter and includes an input terminal and an output terminal, the input terminal being coupled to the first clock signal path, the output terminal being coupled to the second clock signal path; and a fourth inverter that is provided downstream of the first inverter and the second inverter and includes an input terminal and an output terminal, the input terminal being coupled to the second clock signal path, the output terminal being coupled to the first clock signal path.

5. The imaging device according to claim 3, wherein the first clock signal path and the second clock signal path each include a transmission line.

6. The imaging device according to claim 1, further comprising a first reference signal generator that generates the reference signal on a basis of the second clock signal outputted from a first gate circuit among the plurality of gate circuits.

7. The imaging device according to claim 6, further comprising:

a second reference signal generator that generates the reference signal on a basis of the second clock signal outputted from a second gate circuit among the plurality of gate circuits; and a signal wiring line that transmits the reference signals generated by the first reference signal generator and the second reference signal generator to the plurality of light-receiving pixels.

8. The imaging device according to claim 1, further comprising:

a predetermined number of reference signal generators, the predetermined number being larger than or equal to two, the predetermined number of reference signal generators, respectively generating the a plurality of reference signals on a basis of a predetermined number of the second clock signal outputted from a predetermined number of gate circuits among the plurality of gate circuits; and a signal wiring line that transmits the plurality of reference signals generated by the predetermined number of reference signal generators to the plurality of light-receiving pixels, wherein the signal wiring line is divided into a predetermined number of division regions in the first direction, and the predetermined number of the reference signal generators, respectively are coupled to the signal wiring lines in the predetermined number of the division regions.

9. The imaging device according to claim 1, further comprising a signal generator that generates a plurality of the control signals, wherein the plurality of gate circuits and the signal generator are provided on a same side in a second direction as viewed from the plurality of light-receiving pixels, the second direction intersecting the first direction.

10. The imaging device according to claim 1, further comprising a signal generator that generates a plurality of the control signals, wherein the plurality of gate circuits and the signal generator are provided on different sides in a second direction as viewed from the plurality of light-receiving pixels, the second direction intersecting the first direction.

11. The imaging device according to claim 1, wherein the light-receiving circuit is provided on a first semiconductor substrate, the latch circuit is provided on a second semiconductor substrate bonded to the first semiconductor substrate, and the comparison circuit is provided over the first semiconductor substrate and the second semiconductor substrate.

12. The imaging device according to claim 11, wherein the clock signal generator, the plurality of gate circuits, and the plurality of counters are provided on the second semiconductor substrate.

* * * * *